May 7, 1940.  J. W. BRYCE ET AL  2,199,656
MULTIPLYING MACHINE
Filed March 24, 1937  13 Sheets-Sheet 1

INVENTORS
James W. Bryce
Arthur H. Dickinson
BY
Cooper, Kerr & Dunham
ATTORNEYS

May 7, 1940.  J. W. BRYCE ET AL  2,199,656
MULTIPLYING MACHINE
Filed March 24, 1937   13 Sheets-Sheet 2
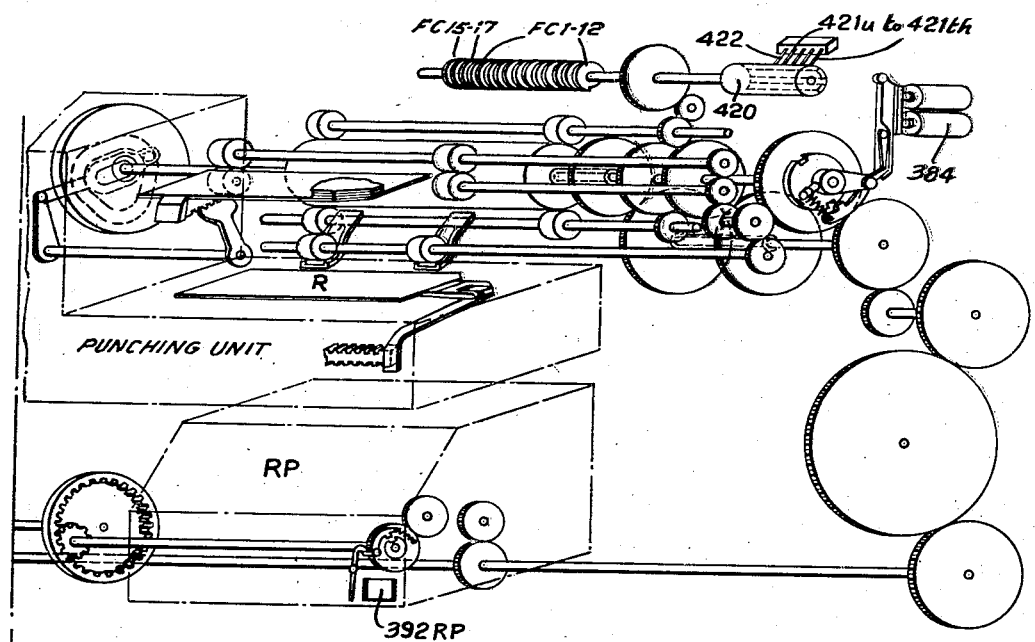
FIG.1a.
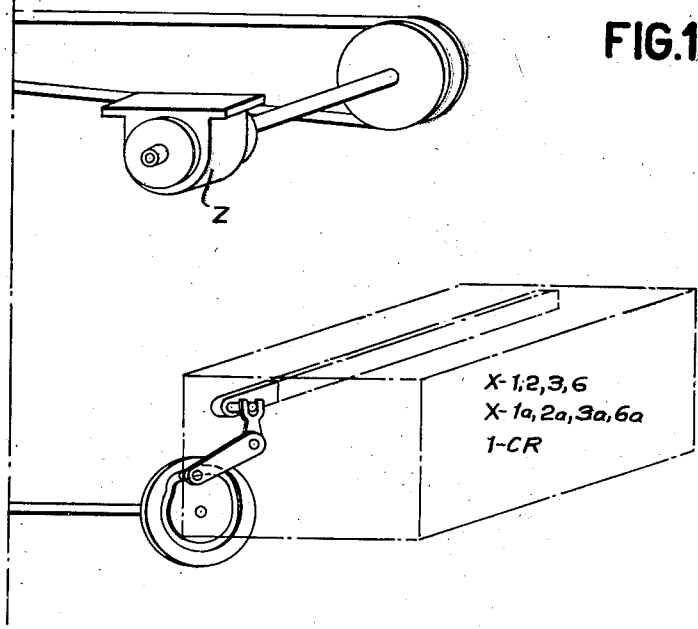
INVENTORS
James W. Bryce
Arthur H. Dickinson
BY
Cooper, Kerr & Dunham
ATTORNEYS May 7, 1940. J. W. BRYCE ET AL 2,199,656
MULTIPLYING MACHINE
Filed March 24, 1937   13 Sheets-Sheet 3

INVENTORS
James W. Bryce
Arthur H. Dickinson
BY
Cooper, Kerr & Dunham
ATTORNEYS

May 7, 1940.     J. W. BRYCE ET AL     2,199,656
MULTIPLYING MACHINE
Filed March 24, 1937     13 Sheets-Sheet 4

INVENTORS
James W. Bryce
Arthur H. Dickinson
BY
Cooper, Kerr & Dunham
ATTORNEYS

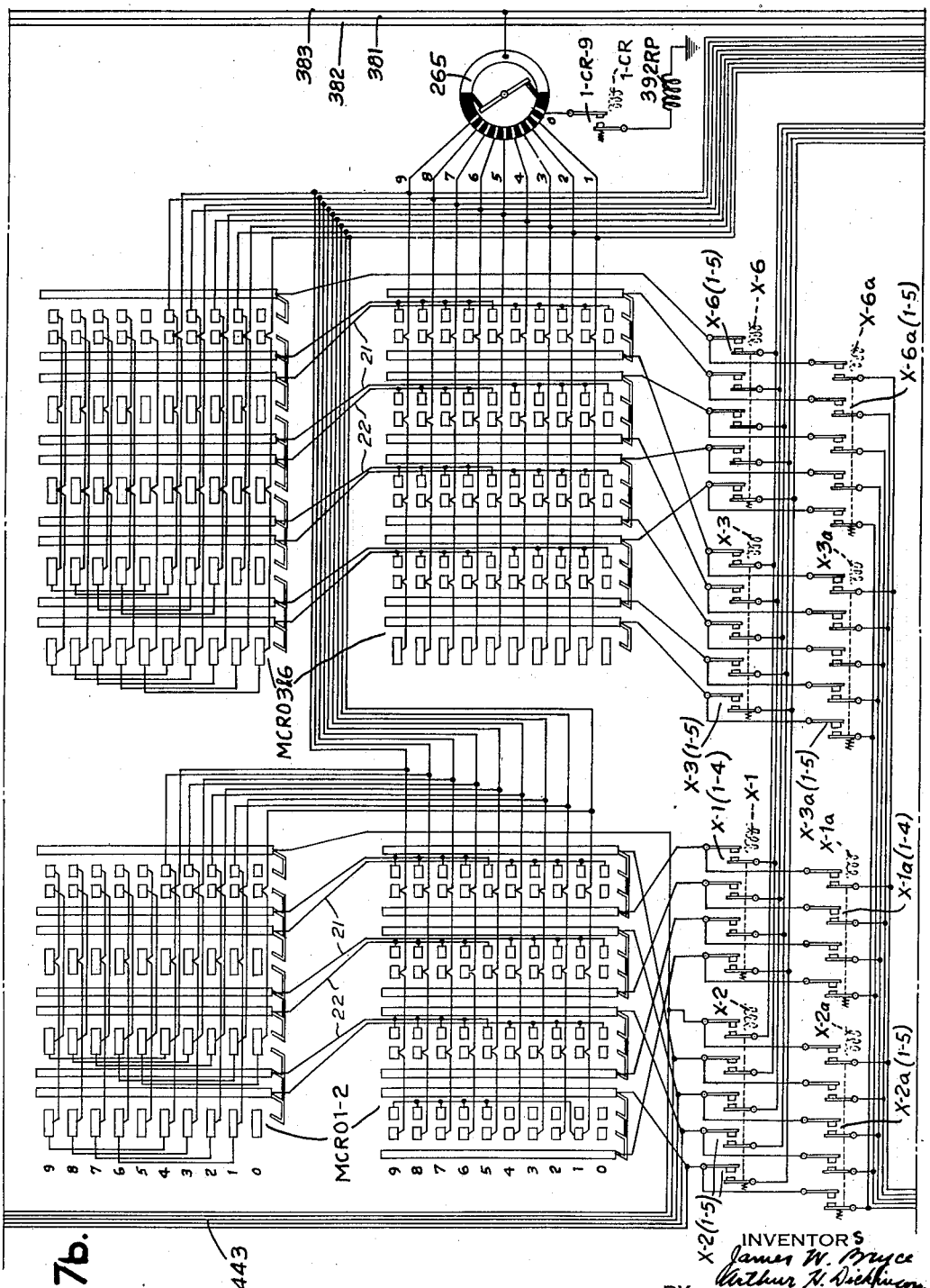

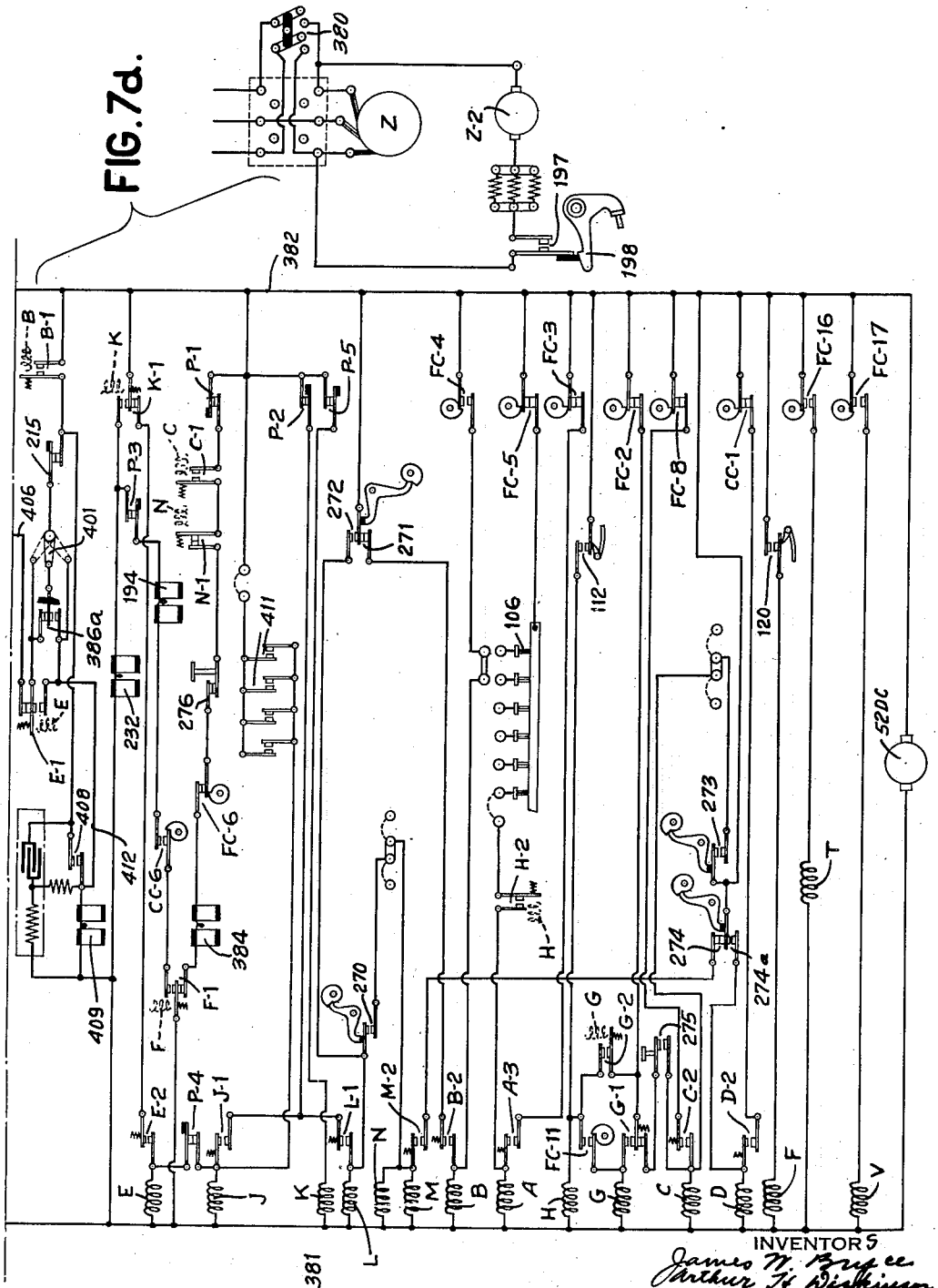

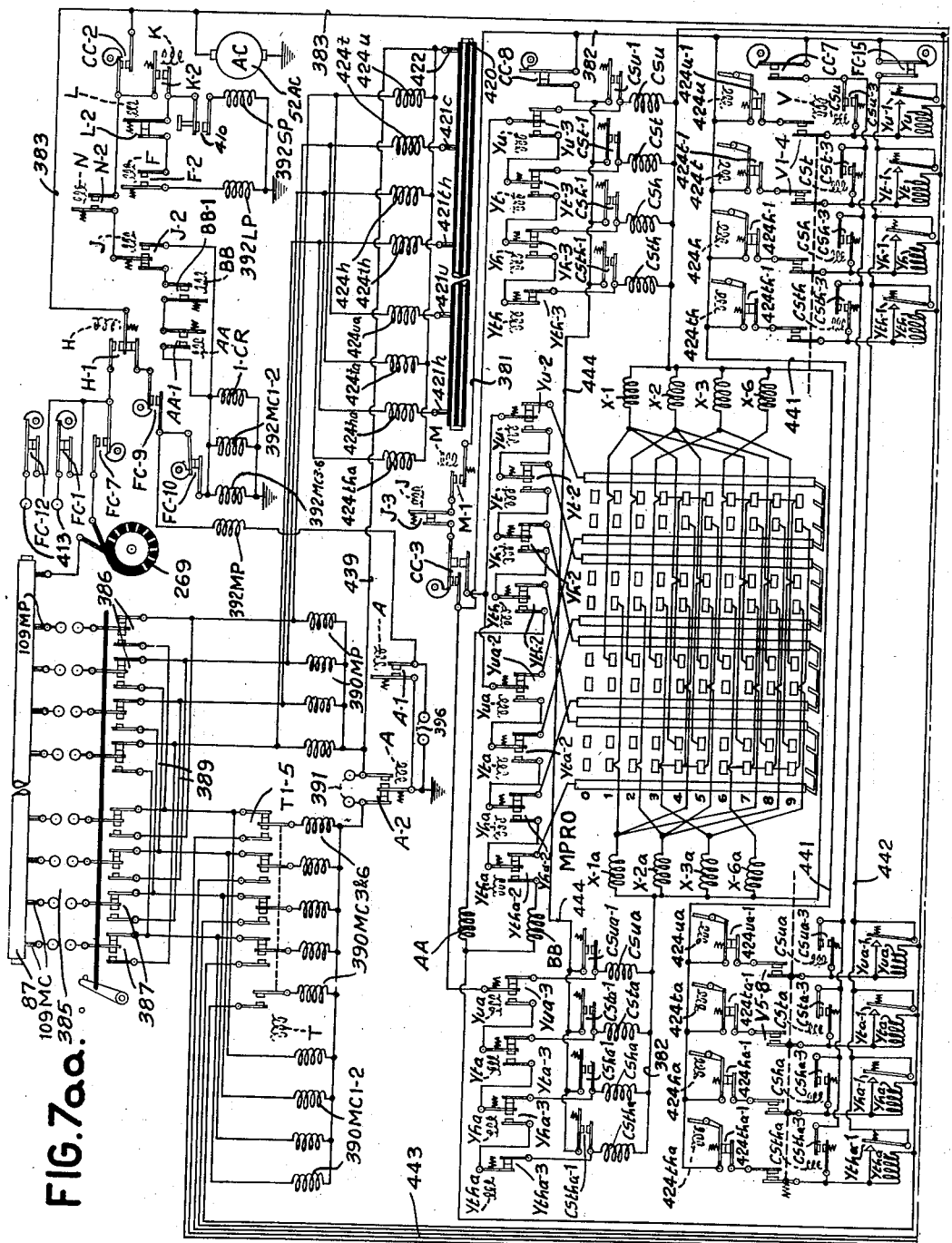

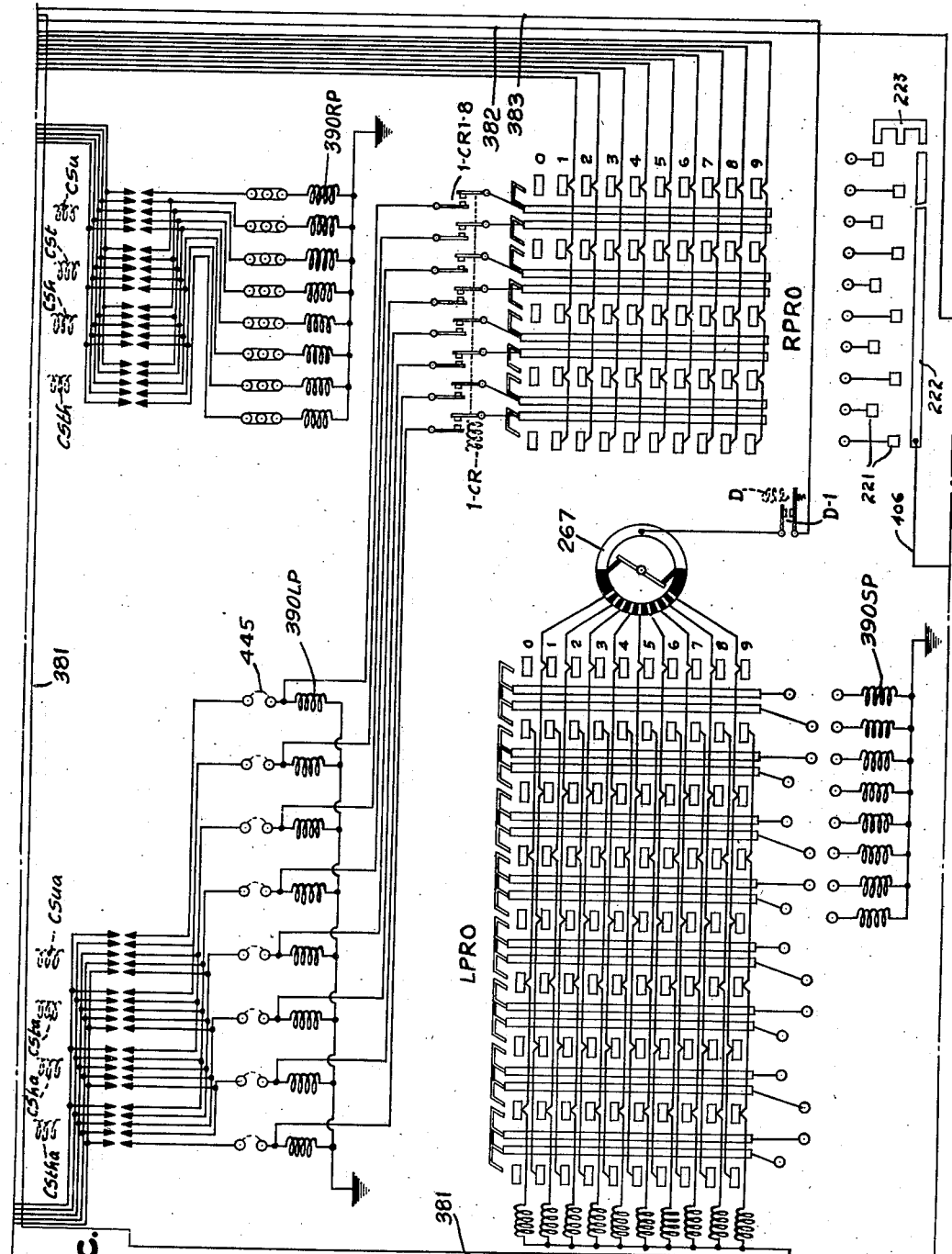

MPRO SCHEMATIC WIRING FOR FIGS. 7a, 7b, 7c, 7d

| | TH | | H | | T | | U | |
|---|---|---|---|---|---|---|---|---|
| | L | R | L | R | L | R | L | R |
| 1 | | 1 | | 1 | | 1 | | 1 |
| 2 | | 2 | | 2 | | 2 | | 2 |
| 3 | | 3 | | 3 | | 3 | | 3 |
| 4 | 1 | 3 | 1 | 3 | 1 | 3 | 1 | 3 |
| 5 | 2 | 3 | 2 | 3 | 2 | 3 | 2 | 3 |
| 6 | | 6 | | 6 | | 6 | | 6 |
| 7 | 1 | 6 | 1 | 6 | 1 | 6 | 1 | 6 |
| 8 | 2 | 6 | 2 | 6 | 2 | 6 | 2 | 6 |
| 9 | 3 | 6 | 3 | 6 | 3 | 6 | 3 | 6 |
| 0 | | | | | | | | |

MPRO SCHEMATIC WIRING FOR FIGS. 7aa, 7b, 7cc, 7d

| | TH | | H | | T | | U | |
|---|---|---|---|---|---|---|---|---|
| | L | R | L | R | L | R | L | R |
| 1 | 1 | | | 1 | 1 | | | 1 |
| 2 | 2 | | | 2 | 2 | | | 2 |
| 3 | 3 | | | 3 | 3 | | | 3 |
| 4 | 3 | 1 | 1 | 3 | 3 | 1 | 1 | 3 |
| 5 | 3 | 2 | 2 | 3 | 3 | 2 | 2 | 3 |
| 6 | 6 | | | 6 | 6 | | | 6 |
| 7 | 6 | 1 | 1 | 6 | 6 | 1 | 1 | 6 |
| 8 | 6 | 2 | 2 | 6 | 6 | 2 | 2 | 6 |
| 9 | 6 | 3 | 3 | 6 | 6 | 3 | 3 | 6 |
| 0 | | | | | | | | |

May 7, 1940.    J. W. BRYCE ET AL    2,199,656
MULTIPLYING MACHINE
Filed March 24, 1937    13 Sheets-Sheet 12

FIG. 11.

EXAMPLE OF OPERATION: FIGS. 7a, 7b, 7c, 7d
OPERATION FOR A PAIR OF COLUMNS.

MULTIPLICAND MULTIPLES = 1, 2, 3, 6.
MULTIPLICAND = 1 FOR ALL EXAMPLES

UNDER CYCLE CONTROLLER
CONTROL BY PAIRS OF
COLUMNS

I    MULTIPLIER = 00

NO MULTIPLE ENTRY CYCLES

II    MULTIPLIER = 01(or 2 or 3 or 6) or 1(or 2 or 3 or 6)0

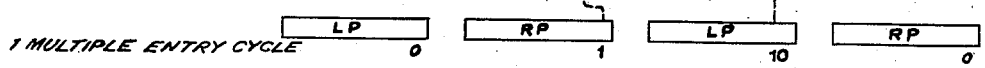

1 MULTIPLE ENTRY CYCLE

III    MULTIPLIER = 1(or 2 or 3 or 6) 1(or 2 or 3 or 6)

1 MULTIPLE ENTRY CYCLE

IV    MULTIPLIER = 09(or 8 or 7 or 5 or 4) or 9(or 8 or 7 or 5 or 4)0

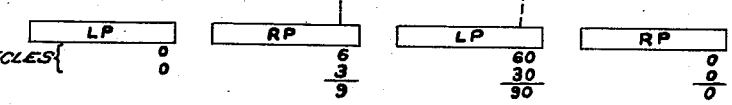

2 MULTIPLE ENTRY CYCLES

V    MULTIPLIER = 1(or 2 or 3 or 6) 9(or 8 or 7 or 5 or 4) or 9(or 8 or 7 or 5 or 4) 1(or 2 or 3 or 6)

2 MULTIPLE ENTRY CYCLES

VI    MULTIPLIER = 9(or 8 or 7 or 5 or 4) 9(or 8 or 7 or 5 or 4)

2 MULTIPLE ENTRY CYCLES

INVENTORS
James W. Bryce.
Arthur H. Dickinson
BY
Cooper, Kerr & Dunham
ATTORNEYS May 7, 1940.　　J. W. BRYCE ET AL　　2,199,656
MULTIPLYING MACHINE
Filed March 24, 1937　　13 Sheets-Sheet 13

FIG. 12.　EXAMPLES OF OPERATION-FIGS. 7aa, 7b, 7cc, 7d

MULTIPLICAND MULTIPLES 1, 2, 3, 6
MULTIPLICAND = 1 FOR ALL EXAMPLES

UNDER CYCLE CONTROLLER
CONTROL BY INDIVIDUAL
COLUMNS OF A PLURALITY
I　　OF COLUMNS　　　　MULTIPLIER = 00

NO MULTIPLE ENTRY CYCLES

II

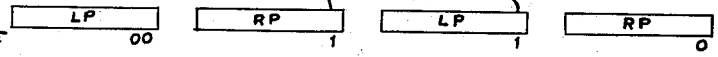

1 MULTIPLE ENTRY CYCLE

III

1 MULTIPLE ENTRY CYCLE

IV

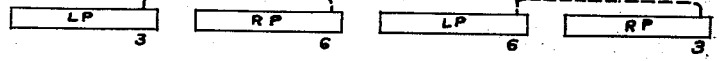

1 MULTIPLE ENTRY CYCLE

V

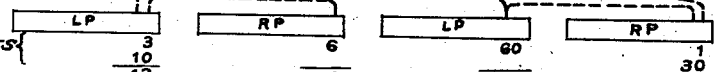

2 MULTIPLE ENTRY CYCLES

VI

2 MULTIPLE ENTRY CYCLES

VII

2 MULTIPLE ENTRY CYCLES

VIII

3 MULTIPLE ENTRY CYCLES

INVENTORS
James W. Bryce
Arthur H. Dickinson
BY
Cooper, Kerr & Dunham
ATTORNEYS

Patented May 7, 1940

2,199,656

UNITED STATES PATENT OFFICE 2,199,656

MULTIPLYING MACHINE

James W. Bryce, Glen Ridge, N. J., and Arthur H. Dickinson, Bronxville, N. Y., assignors to International Business Machines Corporation, New York, N. Y., a corporation of New York Application March 24, 1937, Serial No. 132,702

27 Claims. (Cl. 235—61.6)

This invention broadly relates to improvements of calculating machines including multiplying means comprising setup means for a plurality of complete multiplicand multiples from which entries are selectively made into products receiving means under the control of multiplier factor manifesting means according to the digit values of the multiplier thereon.

More specifically the invention relates to improvements in the above mentioned type of machines of the so-called incomplete series type and still more specifically the present invention relates to such machines of the incomplete series type wherein not more than two terms are required to provide any of all the missing terms of the series. In prior machines of this general class, typical embodiments thereof being disclosed in British Patents Nos. 456,367 and 456,368 and in British Patent No. 432,172, corresponding to United States Serial No. 35,072, filed August 7, 1935 and in British Patent No. 430,555, corresponding to United States Serial No. 78,123, filed May 6, 1936, various means and arrangements are shown to attain calculating speeds comparable to or better than the speed of the partial products type of machine such as is shown in Daly U. S. Patent No. 2,045,437. Generally stated, prior machines of the multiple multiplicand type have attained high calculating speeds at the expense of complication of mechanism and with prior machines where relatively simple mechanisms were provided machine operating speeds were correspondingly slower.

Generally the present invention has for its object, the provision of a machine which will provide reasonably high operating speeds with a reasonably simple mechanism.

Otherwise expressed, a general object of the present invention is in the provision of a machine with parts coordinated and arranged to provide a desired mean between a high speed machine with attendant complication of mechanism and a machine with undesired lower speed with attendant simplicity of mechanism.

A further general object of the instant invention resides in the provision of machine constructions adapted to take into account the general probabilities or chance occurrences of multiplier digits as to the disposition thereof in adjacent or non-adjacent columns and of zeros in adjacent or non-adjacent columns to the general end that machine cycles may be saved wherever possible.

A further general object of the instant invention is to provide novel machine control means which take into account the digital values of numerals of the multiplier, the position of the significant digits of the multiplier with respect to each other and the position of a zero or zeros with respect to each other and to other significant digits, to so control the machine cycles of the machine to attain the maximum possible speed of operation without undue complication of mechanism.

Generally stated, the fastest machines of the prior art obtain their product, i. e. enter the product into the product receiving means and gather product components together into the complete product in $n/2+1$ machine cycles, see, for example British Patent No. 456,368, where $n$ equals the number of significant digits in the multiplier.

According to the present application, two embodiments of machine controls are disclosed. The main embodiment is such that the machine obtains the product in a number of product obtaining cycles, $n$, which equals $(n'+2n_2)+1$ machine cycles, where $n'$ equals the number of pairs of multiplier columns in which a digit or digits appear with any digit of the pair of such numerical value as to require not more than one multiple entry and where $n_2$ equals the number of pairs of multiplier columns, each pair comprising a digit or digits and wherein at least one of the digits of the pair (or both of the digits of the pair) is or are of such numerical value as to require two multiple entries.

In counting pairs according to this embodiment, pairing is commenced with the units order, that is, the units and tens order form one possible pair, the hundreds and thousands form another possible pair and so on. Counting of pairs is as per the above rule for such pairs which contain a significant digit or digits.

According to the modified embodiment, the product obtaining machine cycle speed N may be defined as follows: $N=(X+Y-Z)+1$, where $X$ equals the number of multiplier digits requiring an entry of two multiples and $Y$ equals the number of multiplier digits requiring the entry of only one multiple and $Z$ equals the number of pairs of significant multiplier digits with each digit of the pair requiring the entry of only one multiple and with such paired digits either in immediately adjacent columns or in columns separated by an even number of columns. Pairs are preferably counted starting from the right of the multiplier amount and beginning with the first significant multiplier digit which requires only a single multiple entry. A digit once used in making up a pair cannot be used again for forming another pair.

The present invention has also for one of its objects the provision of a machine which will incorporate certain features of the British Patent No. 456,368, viz. the feature of carrying out computations pertaining to a plurality of significant digit multiplier columns concurrently while simplifying the multiple representing means.

A further object of this invention therefore comprises the provision of a construction which will compute according to a plurality of columns of the multiplier concurrently with maintained simplicity of the multiple of the multiplicand representing means.

A further object of the present invention resides in the provision of a machine which will compute according to a plurality of columns of the multiplier concurrently and which machine will require not more than two multiples of the multiplicand receiving means with four representing means for multiplicand multiples.

In previous machines, such as shown in British Patent No. 456,368, where computations pertaining to two columns of the multiplier were effected concurrently, the two columns always had to be in two adjacent columns. According to certain embodiments of the instant application, provision is made where computations may be effected where such multiplier digits may be in non-adjacent columns and the present invention has accordingly for one of its objects the provision of a machine capable of such operation.

A further broader object of the present invention is to provide a machine construction which will minimize the number of entry cycles into the products receiving means by taking into account the numerical value of the digit or digits so as to save entry time when it is possible to do so.

A further object of the present invention resides in the provision of a novel cycle controller for controlling the number of entry cycles into the product receiving means with means for controlling the cycle controller directly under record card control.

A further object of the present invention resides in the provision of a cycle controller with means for controlling it, which means functions wholly independently of the multiplier entry retaining means.

A further object of the present invention resides in improved column shift control which does not operate with a determined order of succession as heretofore, but which operates with a selectively variable order of succession so that entry time in the product receiving means may be saved.

A further object of the present invention resides in the provision of a multiplying machine with cycle control means for controlling its operation so that concurrent computing operations pertaining to higher or lower orders may be effected first followed by operations pertaining to intervening orders.

While previous machines, as stated above, concurrently enter two component multiples, such previous machines cannot function to effect concurrent entries upon more than one column of the multiplier, that is to say, previous machines would enter two component multipliers concurrently if required, but if a single multiplier only were required the machine would operate to enter this single multiple alone. According to the present invention two multiples may be concurrently entered irrespective of whether such multiples are related to a single multiplier digit or to a plurality of multiplier digits.

Further and other objects of the present invention will be hereinafter set forth in the accompanying specification and claims and shown in the drawings which show by way of illustration a preferred embodiment and the principle thereof and what we now consider to be the best mode in which we have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together, show a somewhat diagrammatic view of the units of the machine and also the driving mechanism for the various units;

Figs. 7a, 7b, 7c and 7d, taken together and arranged vertically in the order named, show a complete circuit diagram of the machine and one preferred embodiment of the invention;

Figure 7A:
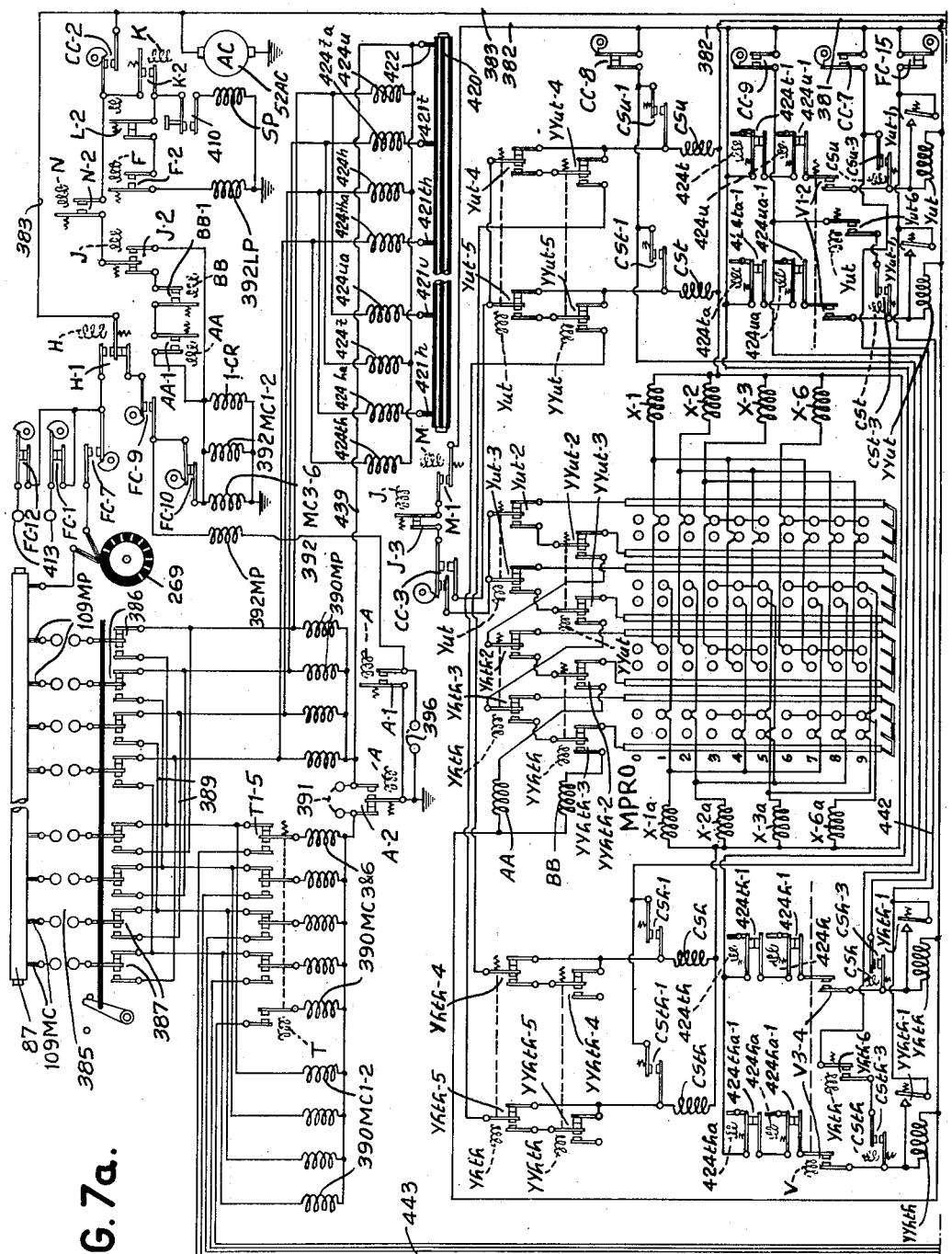
Figure 7C:
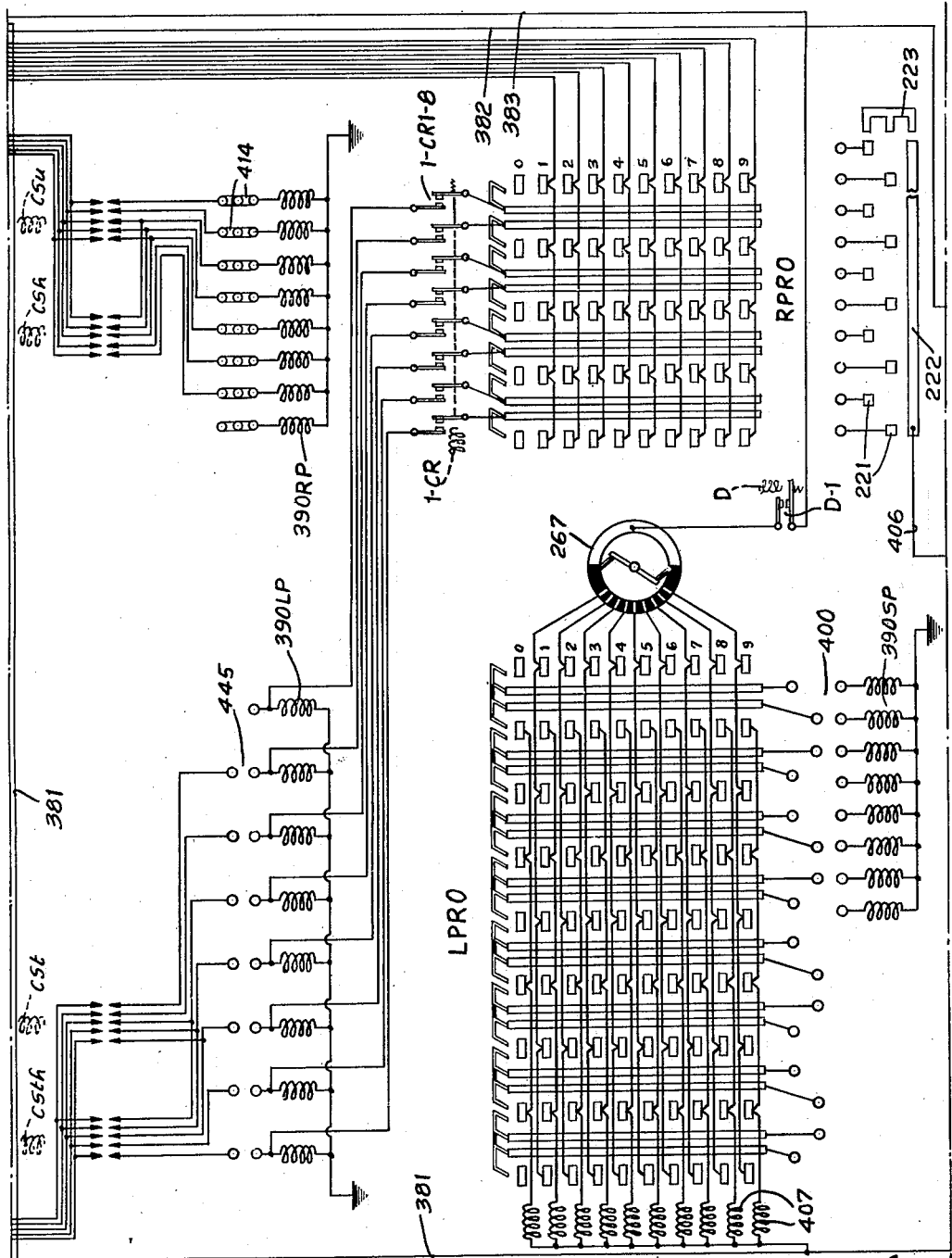
Figures 8, 9, 10:
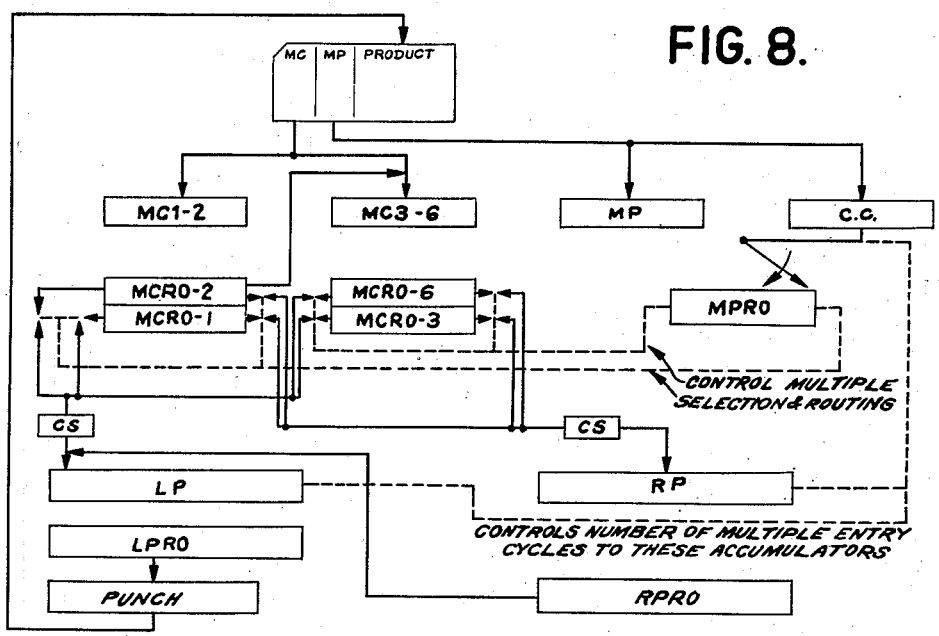

Figs. 7aa, 7b, 7cc and 7d, taken together and arranged vertically in the order named, show a circuit diagram of a modified embodiment of the invention;

Fig. 8 is a diagrammatic view showing diagrammatically the manner in which calculations are made by the machine and the flow of entries and results;

Figs. 9 and 10 show respectively the wiring of the multiplier readout for a main embodiment of the invention and a modified embodiment of the invention;

Fig. 11 is a view showing typical computations performed according to the main embodiment of the invention;

Fig. 12 is a similar view showing typical computations as performed by the modified embodiment of the invention.

Before describing the machine in detail, its general arrangement and principles of operations will be briefly referred to. The multiplier and multiplicand factor amounts are derived from records and entered into suitable receiving devices, one receiving device is provided for the multiplier and two receiving devices are provided for the multiplicand and multiples thereof. Both of the multiplicand receiving devices receive a multiplicand entry from the record and each receiving device has associated with it a doubling readout of the type shown and described in British Patents Nos. 456,367 and 456,368. After entry of the multiplicand in both of the MC receiving devices, double the multiplicand is read out from the doubling readout associated with the MC—I device and is entered into the other receiving device, whereupon the multiplicand times 3 is set up on such other device. After this operation is completed there will be set up and represented and available for readout the following multiples of the entered multiplicand, MC×1, MC×2, MC×3 and MC×6.

The machine includes product receiving means of the dual section type with means for transferring amounts from section to section.

A novel form of cycle controller is provided which is controlled directly from the brushes and which controls and corrects the entry of multiplier amounts. Several alternative cycle controller embodiments are disposed, but each of them sets up selective machine controls for the number of required multiple entries into the product receiving means, these controls taking into account the numerical value classification of significant multiplier digits. The cycle controller controls cause successive multiple entering operations when required and also cooperates with the MP readout to make available sections thereon for multiple selecting control. The MP readout is of dual section type and is so wired as to select MC multiples or multiple components from the multiple set up or representing means and the MP readout also controls the routing of a multiple entry or entries into the product receiving means or sections thereof. Generally, multiple selection is effected as follows:

| Manifested multiplier digit | Selected multiple or multiples |
|---|---|
| 1 | Direct multiple MC×1. |
| 2 | Direct multiple MC×2. |
| 3 | Direct multiple MC×3. |
| 4 | Component multiples MC×3 and MC×1. |
| 5 | Component multiples MC×3 and MC×2. |
| 6 | Direct multiple MC×6. |
| 7 | Component multiples MC×6 and MC×1. |
| 8 | Component multiples MC×6 and MC×2. |
| 9 | Component multiples MC×6 and MC×3. |

The foregoing table shows the selecting out relations from the multiple representing means which are afforded by MPRO. There are also provided controls from MPRO to provide selective routing of multiple entries into the product receiving means and sections in different ways according to two different embodiments of the invention. This selective routing will be hereinafter described in further detail.

The present machine effects multiplication by adding multiples of the multiplicand. As shown in the foregoing table the 1, 2, 3 and 6 multiples which correspond to multiplier digits of one classification, can be directly derived from their respective readouts and such multiples may therefore be termed "direct multiples". For other multiplier digits which are of a different class or classification such as 4, 5, 7, 8 and 9, it is necessary that there be entered two component multiples for each multiplier digit. According to the present invention and according to one embodiment thereof, when component multiples are required to be entered, there may be a concurrent entry of the respective components into LP and RP. However, for direct multiples, since only a single entry is required for each multiplier digit, there may be an entry of multiples pertaining to two digits in different orders of the multiplier and such entry may be effected concurrently.

In general the operation for one embodiment may be explained as follows: If a multiplier digit requires an entry of component multiples such component multiples may be entered concurrently in one multiple entry cycle into LP and RP. If, however, the multiplier digit requires only a single multiple entry the machine will place this single entry into one section of the product receiving device and at the same time that this entry is being made, the machine will concurrently direct into the other section of the product receiving device a multiple of the multiplicand related to another order of the multiplier. In some cases, if the digit in this other order of the multiplier is 1, 2, 3 or 6, a single entry will suffice.

In other cases, if the multiplier digit is 4, 5, 7, 8 or 9, two entries will be required and one of these entries will be effected concurrently with the entry of the multiple amount related to the other order of the multiplier and the supplemental component multiple will be entered upon the next multiple entry cycle.

In order to control the computing and multiple entry operations of the machine in the above selected manner, the machine during the entry of multiplier amounts senses the records and ascertains the values of the significant multiplier digits. Having ascertained this value or values, controls are set up to selectively control the number of multiple entry cycles according to the ascertained value of a digit in one order or according to the ascertained value of a plurality of digits in different orders.

Explained in other words, it may be stated that the machine analyzes the multiplier amount on the record to ascertain whether the digital values of the multiplier are such as to require one multiple entry cycle or more than one entry cycle for an order of the multiplier or for two orders of the multiplier and selectively control machine operations accordingly to save operating time when possible.

MACHINE DRIVE

Figure 2:
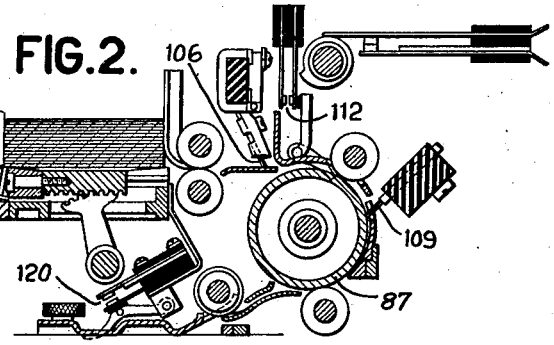
Fig. 2 is a vertical sectional view taken through the card handling and reading section of the machine.

In general the various units of the machine are driven and operated in a similar manner to similarly located units of the machine shown in United States Patent No. 2,045,437. The machine embodies a card feed, card handling and sensing section which is shown in section in Fig. 2 and which is also shown to the top and to the right of Fig. 1a. A detailed description of this figure need not be given as it is identical with a similar section in the machine of the Daly patent above referred to.

Figure 6:
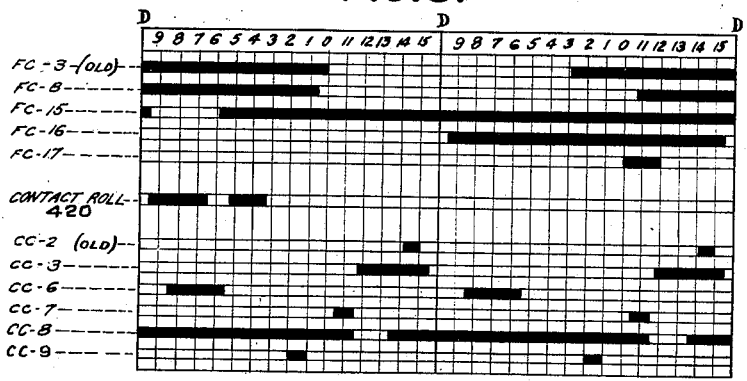
Fig. 6 is a timing diagram of the cam contact devices of the machine which have novel timing relations.

As in the Daly patent, a number of FC cams are provided, which include cam contacts FC—I to 12. Cam contacts FC—I to 7 and contacts FC—9 to 12 are timed exactly as similarly lettered cams are timed in the Daly patent above referred to. Cam contacts FC—8 of the instant machine and additional cams FC—15 to 17 inclusive, are timed as shown in the timing diagram (Fig. 6). Driven from the shaft, which drives the FC cams, is a commutator 420 (see Fig. 1a). Cooperating with the commutator or contact roll are a number of brushes 421u to 421th and a feed brush 422. The timing of the circuits as closed by the brushes and as established by the contact roll is shown on the timing diagram, Fig. 6. There is also provided a customary punching unit which is diagrammatically indicated in Fig. 1a and labeled "Punching unit".

Figure 1:
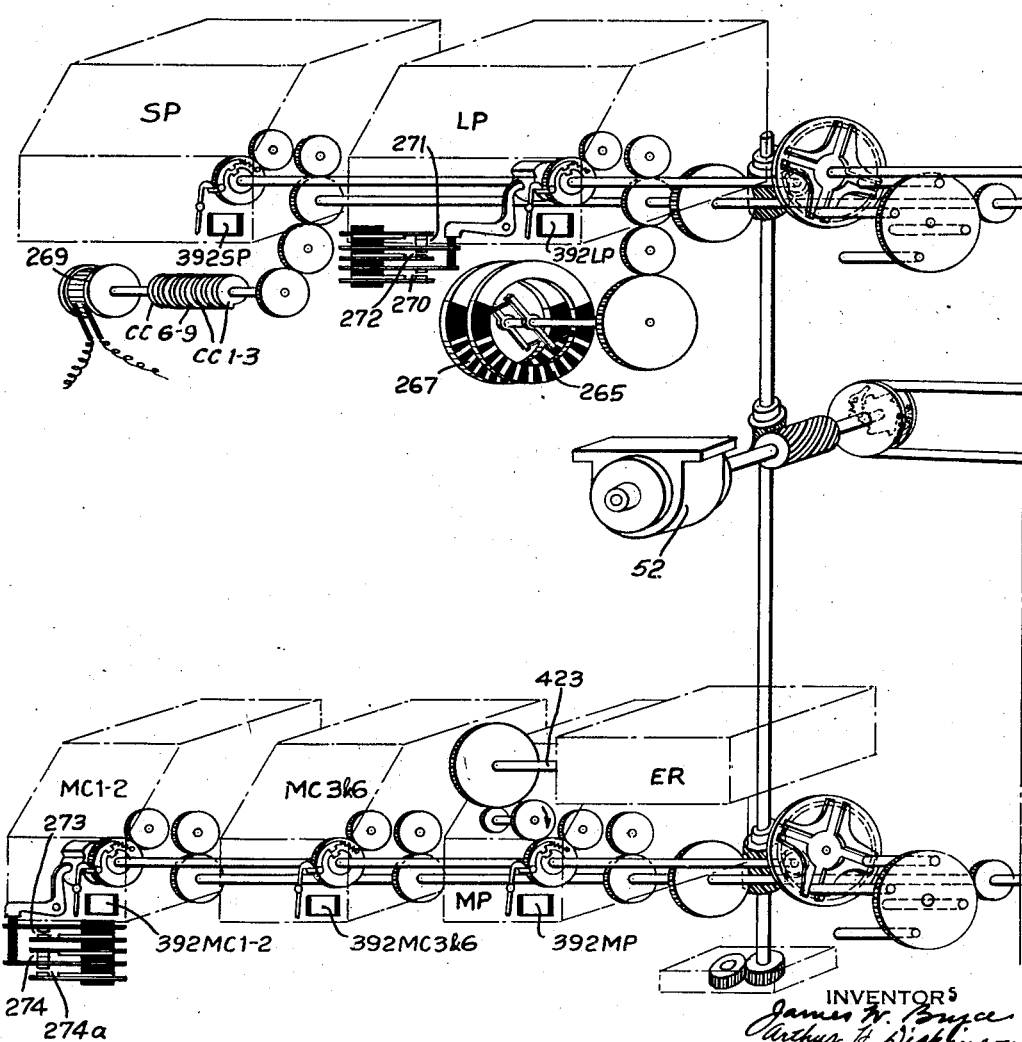

Referring now to Fig. 1, a number of CC cams are provided for operating the CC cam contacts. CC—I and CC—2 are timed the same as with correspondingly lettered cams of the Daly patent and supplemental cams CC—3 and CC—6 to 9 inclusive, are timed as shown in the timing diagram (Fig. 6). Two emitters 265 and 267 are likewise provided, driven in the manner indicated and more fully described in the Daly patent. There is also a single impulse distributor, designated 269.

The machine includes the usual driving motor Z and the customary A. C.-D. C. generator, which is marked 52 on Fig. 1 and designated in the customary manner, i. e. 52AC and 52DC on the wiring diagrams.

ACCUMULATORS AND ENTRY RECEIVING DEVICES

The instant machine includes two accumulators LP and RP for receiving product components. There is also the customary summary product accumulator SP for receiving a summation of products. There are also two entry receiving devices for receiving multiplicand amounts and for setting readouts so that the multiplicand amount or certain multiples thereof may be derived therefrom. In general construction, these receiving devices are of the form shown in the Daly patent, but the readout constructions are different. The receiving devices for multiplicand multiples are designated MCI-2 and MC3 and 6. The suffix designates the amount of the multiple that can be derived from the particular device. These receiving devices are set or positioned in accordance with the first suffix figure, i. e. MCI—2 is set with MC×1 thereon and MC3 and 6 is set with MC×3 thereon. Inasmuch as straight and doubling readouts of the type shown in British Patent No. 456,367 are provided on each receiving device, MC×1 and MC×2 can be derived from one device and MC×3 and MC×6 can be derived from the other device. Associated with the MC—1 entry receiving device is an MCRO—1 readout shown on Fig. 7b of the circuit diagram. Driven from this readout is another readout MCRO—2 (see also Fig. 5). Both the MCRO—1 and MCRO—2 readouts are of the so-called dual type. The MCRO—1 readout has one section which is wired for direct readout of the amount of the multiplicand standing in the MC—1 accumulator. The MCRO—2 readout is so wired to the emitter 265 that any readout therefrom will be double that of the brush position. For example, if the units brush of MCRO—2 is standing on the spot "7", by tracing the wiring to the emitter 265 it will be noted that there will be an actual readout of "4" which is twice 7 in the units place. However, when the double amounts to be read out are within the range from the 5 to 9 positions, the readout from the next higher column must be increased by one, that is, if there is an entry of 19 into MC—1, the actual amount read out from MCRO—2 must be 38, the tens column reading being 1×2+1=3. This is provided for by extending the readout circuits from the tens, hundreds and higher order columns of the MCRO—2 readout to an extra or piloting section of the MCRO—1 readout. The wiring between MCRO—1 and MCRO—2 is provided for this purpose, note particularly wires designated 21 and 22. It will be noted that wiring 22 extends to spots 5 to 9 inclusive on the extra section of the MCRO—1 readout and that the wiring 21 extends to spots 0 to 4 inclusive of such piloting section of MCRO—1. Accordingly, one section of the MCRO—1 readout pilots the reading to be derived from MCRO—2 increasing the readout therefor by one in the next higher order when required. A special arrangement of wiring from the emitter 265 to the MCRO—2 readout provides for the required double amount to be read out. As stated before, the other section of the MCRO—1 readout is utilized for a direct or straight readout in the amount standing in the accumulator.

There is also a receiving device MP for the multiplier amount driven in the customary manner.

The instant machine, in lieu of using multiplying relays as in the Daly patent, utilizes electro-mechanical relays of a type similar to those used for the multiplying relays of the Daly patent, but these relays are used not for controlling the creation of partial product representing impulses, but in contradistinction, are used for multiplicand multiple selection purposes only. Such relays will be designated X—1, X—2, X—3, X—6, X—1a, X—2a, X—3a and X—6a and there is also an additional controlling relay designated 1—CR. These relays are mechanically controlled in the same manner as the multiplying relays of the Daly patent and are electrically tripped, but the control of the tripping circuits is new and novel in the instant application. It may also be mentioned that according to the Daly construction electro-mechanical relays were utilized for column shift purposes, but according to the instant application, purely electrical relays are used for column shift purposes.

The various entry receiving devices and accumulators are provided with the customary reset controls including control magnets 392SP, 392LP, 392RP, 392MCI—2, 392MC3—6 and 392MP. The LP accumulator has reset control contacts which are shifted upon reset, viz. 271, 272 and 270. The MCI—2 receiving device also has contacts which are shifted upon reset, viz. 273, 274 and 274a.

ELECTRO-MECHANICAL RELAY UNIT

Referring now to Fig. 1, the reset gear for the MP receiving device through the gearing diagrammatically illustrated, drives a shaft 423. The driving relations are such that shaft 423 makes one-quarter of a revolution each time the MP receiving device is reset.

Figure 4:
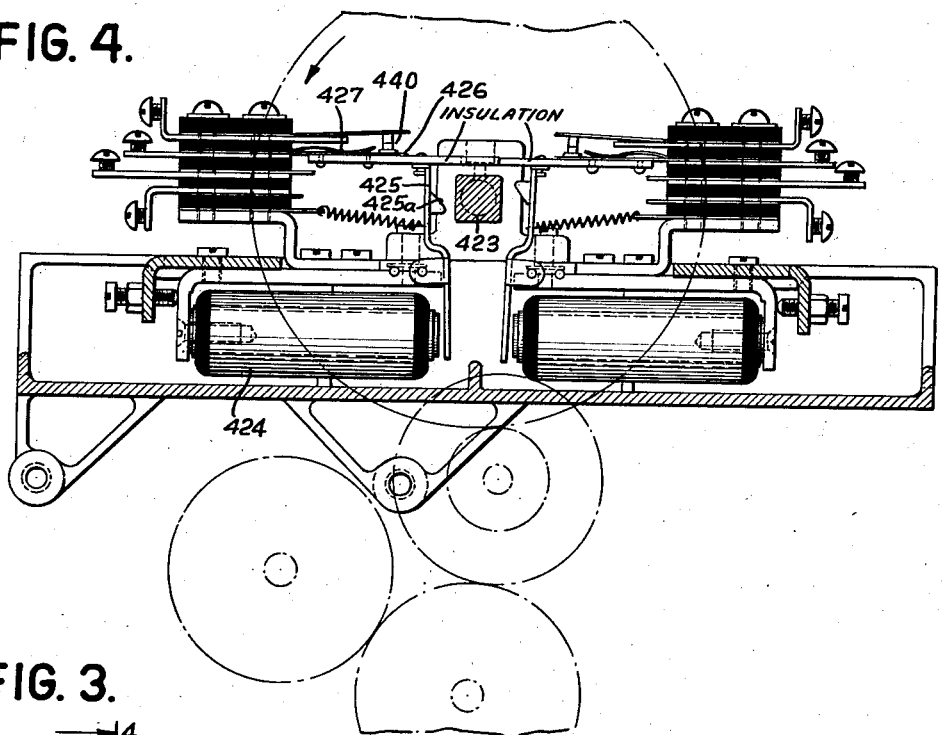
Fig. 4 is a sectional view of the mechanism of a relay unit, the section being taken on line 4—4 of Fig. 3.
Figure 3:
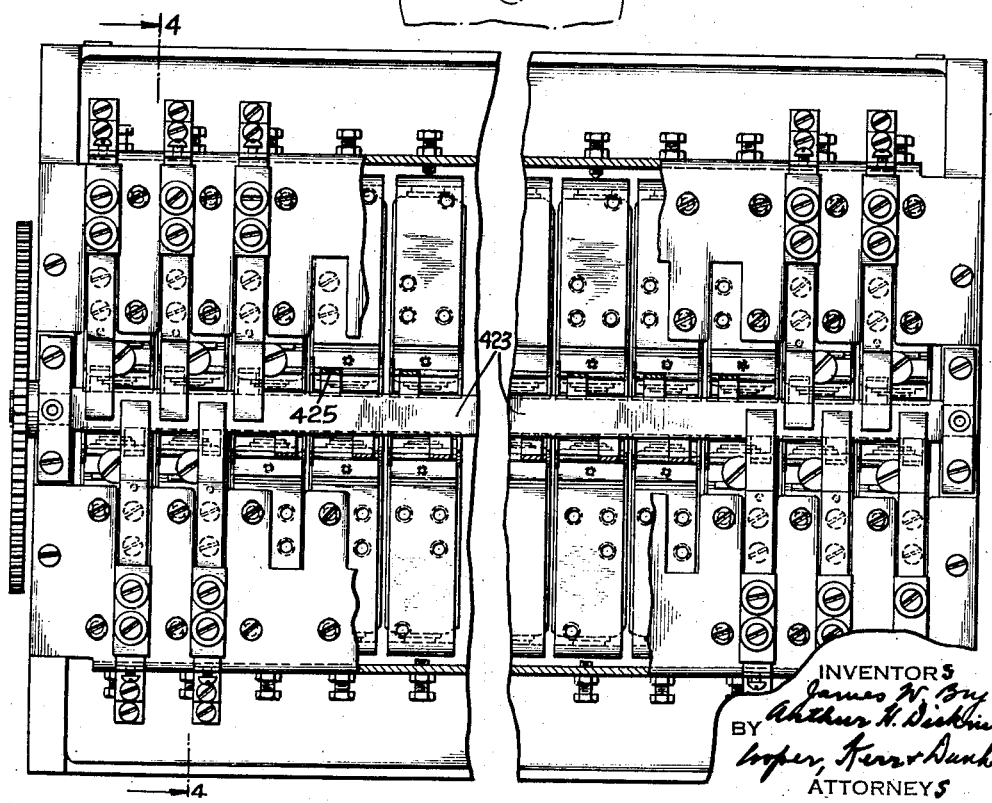
Fig. 3 is a top plan view of a certain electromechanical relay mechanism used in the machine. The contacts of this unit are electromechanically tripped and mechanically restored.

Referring now to Figs. 3 and 4, the shaft 423 is suitably journaled as shown and intermediate the journals the shaft is provided with a square cross-section as clearly shown in Fig. 4.

In general, the contact operation in this unit is as follows: There are a number of individual normally closed contacts. Each contact pair has associated with it a tripping magnet. The magnet, when energized, trips the contacts so that under spring action, they spring to open position. Such contacts thereupon remain open until the shaft 423 makes one-quarter of a revolution whereupon the contacts are mechanically restored to closed position and thereafter are latched in such position. The rotation of the shaft also mechanically knocks off the armature and as stated before, mechanically restores the contacts to closed position.

The details of this electro-mechanical relay unit, which will be generally designated ER, forms the subject matter of a copending application of James M. Cunningham, Serial No. 135,503, filed April 7, 1937.

Referring to Fig. 4, 424 represents generally one of the tripping magnets. Cooperating therewith is a spring retracted armature 425 which has its upper portion in contact with a latch piece riveted to an insulating strip which contact blade 426 is riveted to and overlies. 426 is spring biased downwardly by a spring 427. The insulating material extends along and overlies the square shaft 423. It will be self-evident that upon the energization of a magnet 424 its related pair of contacts will trip to open position, thereafter upon one-quarter of a revolution of rotation of shaft 423, one square corner of the shaft will first abut the insulating strip beneath blade 426 and lift it to upper position re-closing its contacts and slightly later, another corner edge of the square shaft will intercept a camming element 425a integral with the armature 425 and positively shift the armature away from the magnet and into latching position.

The details of contact mounting and the adjustments of the parts need not be here described in detail as they form no part of the present invention and are fully set forth in the Cunningham application above referred to.

READOUT DEVICES

Figure 5:
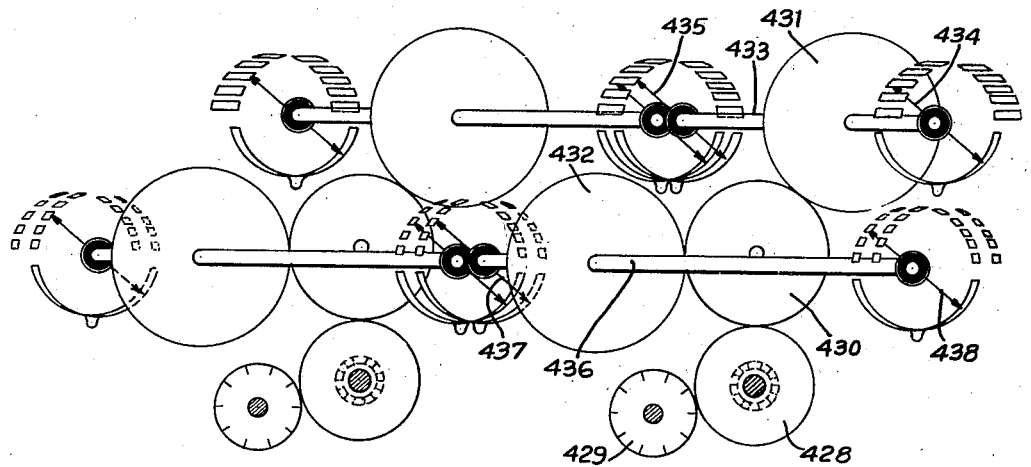
Fig. 5 is a diagrammatic view of the readout device used on certain of the receiving devices of the machine, more particularly, the receiving devices for multiplicand multiples.

Referring now to Fig. 5, this shows diagrammatically the manner of drive of a doubling readout. In this figure, 428 represents the clutch element for one order in an MC receiving device, 429 diagrammatically designates an indicating wheel. 430 is an idler gear driven from the clutch gear 428. The idler gear drives gear 431 and also a gear 432. 431 in turn drives a shaft 433 which turns two brush assemblages 434 and 435. These traverse the segment spots in the manner diagrammatically illustrated. Gear 432 likewise drives a shaft 436, which in turn drives two brush assemblages 437 and 438. A similar arrangement is repeated for other orders of the readout. The details of wiring of the doubling readout need not be here described in detail as the doubling readout wiring is fully described in British Patent No. 456,367.

According to the present invention the multiplier factor manifesting and receiving means controls and selects the reading out of a selected multiple or multiples or component multiples from the multiplicand multiple representing means and selectively controls the routing of entries to the result receiving means and the cycle controller controls the number of multiple entry cycles for the entry of such multiples or multiple components into the product receiving means. The cycle controller and the spot wiring of MPRO are shown in two different embodiments. According to the embodiment of Figs. 7a to 7d, the cycle controller control is an individual one by pairs of possible multiplier columns and the cycle controller selectively causes one or two successive multiple entry cycles according to whether the digits of the pair require one or two multiple entry cycles.

According to the modified embodiment shown in Figs. 7aa, 7b, 7cc and 7d, the cycle controller control is still by a plurality of columns, i. e. by two multiplier columns at a time, but the control is individual by each column according to whether the digit is such as to require one or two multiple entries.

Heretofore with multiplying machines, it has been the usual practice to effect computations proceeding first with a digit in one column of the multiplier and then with a digit in another column and so on. Certain constructions as shown in British Patent No. 456,368 have been previously provided wherein more than one column of the multiplier was taken into consideration and computation was effected therefor at the same time, but such previous constructions involved means affording a complete set of multiplicand components from 1 to 9.

The present machine, according to the preferred embodiment which is shown in circuit diagram, Figs. 7a to 7d inclusive, is arranged to save operating time by computing by pairs of multiplier digits. For example, assume the multiplier amount was 2787. The machine would compute for the 87 pair, viz., the units and tens order digits and after this computation was completed it would compute with the digits in the hundreds and thousands order of the multiplier, viz., 27. The general law of operation may be best explained by considering the following cycle table which shows representative combinations of multiplier digits:

| | | |
|---|---|---|
| 1 | 00 | No cycles |
| 2 Pair comprised of digits, each digit requiring only one multiple entry. | 11<br>22<br>63<br>36 | 1 cycle |
| 3 Pair comprised of digits, each digit requiring the entry of two multiples. | 44<br>55<br>77<br>98<br>89 | 2 cycles |
| 4 Pair which includes a zero and digit requiring the entry of a single multiple. | 01<br>02<br>03<br>06 | 1 cycle |
| 5 Pair which includes a zero and a digit requiring the entry of two multiples. | 04<br>05<br>07<br>08<br>09 | 2 cycles |
| 6 Pair including one digit which requires an entry of two multiples and the other digit requiring the entry of one multiple. | 14<br>25<br>37<br>68<br>19 | 2 cycles |

In explanation of the foregoing table, the typical computation marked "1" involves zeros in two adjacent orders. Under this condition there will be no entries whatsoever effected in the product receiving device and no machine cycles will be involved whatsoever.

Considering now the typical computation No. 2 of the foregoing table here it will be noted that all of the digits are of such numerical value that only one multiple is required for each digit. Under this condition of operation the multiple of the multiplicand corresponding to the units order digit of the multiplier will be entered into RP and the multiple related to the tens order digit will be entered into LP. Furthermore, both of these entry operations will be effected concurrently so that in one machine cycle computations pertaining to two orders of the multiplier may be effected.

Referring now to the above computation marked "3", here digits in adjacent orders of the multiplier are both of such value that each digit will require two multiple component entries. With this type of computation the machine in one machine cycle puts one component into the product receiving device in one cycle and upon the following cycle it puts thereinto the other component. Thus with a multiplier amount of 44, the 3 multiple component pertaining to the units order of the multiplier would be entered into RP and concurrently in the same machine cycle the 3 multiple component related to the tens order multiplier digit would be entered into LP, then upon the next following machine cycle there will be a concurrent entry of the 1 multiple into both RP and LP.

In passing it may be mentioned that according to the present invention and the embodiment thereof shown in Figs. 7a to 7d inclusive, the machine always enters multiples pertaining to the left hand digit of a pair into LP and enters components pertaining to the right hand of a digit into RP.

Referring now to the typical computation numbered "4" above, here the pair includes a zero and the digit is of such value that only a single multiple entry is required. Only one machine cycle will be required and the single multiple entry will be made into RP with any of the amounts enumerated. It may be explained, however, that the significant digit may be in the left hand column of a pair and the zeros may be in the right hand column. In this case the same number of entry cycles would be involved, viz., one entry cycle, but the entry would be made in the LP instead of into RP.

Referring now to typical computation "5" above, here the digits are of such value that each digit requires two entries. In such case one component of the two components would be entered in one machine cycle and the second component would be entered in the following machine cycle. With the amounts illustrated above the component entries would always be made into RP. It is obvious that the zero may occur to the right of a pair and the significant digit to the left of a pair. In this event the entries would go into LP.

Referring now to typical computation numbered "6" above, here the pair includes a multiplier digit, which, by its size requires two component entries and the pair also includes a digit of such value that only one entry is required. Taking the multiplier amount of 68, on the first machine cycle the 6 multiple would be entered into LP, taking care of the computation for the tens order of the multiplier and concurrently in the same cycle the 6 component of 8 would be entered into RP. Then on the following cycle the remaining 2 component of 8 would be entered into RP. During such second cycle there would be no entry whatsoever made into LP. With computations of this sort, it will be appreciated that the multiplier digit involving an entry of two multiples may be to the left of the pair and the single entry multiplier digit may be to the right of the pair. In this event the two components would be entered into LP and the single component entered into RP and such single component entry would also be made in the first cycle of the two machine cycles.

According to the Fig. 7a to 7d embodiment, the machine always operates with pairs of multiplier digits in adjacent columns and it completes all computations pertaining to one pair before operations proceed with the following pair.

CIRCUIT DIAGRAM AND OPERATION

The pre-punched cards are first placed in the supply magazine of the machine, thereafter the operator closes switch 380 (Fig. 7d), providing current for the main driving motor Z. The motor Z drives the A. C.-D. C. generator 52 and the D. C. section supplies direct current to buses 381 and 382. Alternating current impulses are supplied by A. C. section to ground and to bus 383. The start key is now depressed to close start key contacts 275 (Fig. 7d) and to complete a circuit from the 381 side of the D. C. line, through relay coil C, through contacts 275, through relay contacts G—1 now closed, through cam contacts FC—2 to the 382 side of the D. C. line. A stick circuit is established through contacts C—2 of relay coil C and cam contacts FC—8 now closed. Energization of relay coil C also closes contacts C—1 and a circuit is established from the 381 side of the D. C. line through relay contacts F—1 now closed, through card feed clutch magnet 384 (see also Fig. 1a), through FC—6, through stop key contacts 276, through relay contacts N—1 and C—1, through punch controlled contacts P—1 and back to line 382. As usual in machines of this class, the start key must be kept depressed or re-depressed for four machine cycles when a run is originally initiated. Starting is prevented as is customary until the feed rack of the punch is in right hand position, such control being provided for by contacts P—1.

The first complete card feed cycle will advance the first card to a point where the X (first extra index point position of the card) will be in alignment with the X brush 106 in which position the 9 index point position of the card will be just about to be passed under the brushes 109. At the beginning of the next card feed cycle, the card traverses the brushes 109 and during the first machine cycle the multiplier and multiplicand are read from the card and entered respectively into MP and into the MC1—2 and MC3 and 6 receiving devices. It may be mentioned that the multiplicand is entered concurrently into both of the above receiving devices. At the end of the first card feeding cycle card lever contacts 112 (Figs. 2 and 7d) close, energizing relay coil H (Fig. 7d) and shifting relay contacts H—1 (Fig. 7a) to a reverse position from that shown. The second card feed cycle takes place and the card is carried past the brushes.

The entry circuits will now be traced. Current flows from A. C. line 383 (Fig. 7a) through relay contacts H—1 now shifted, through cam contacts FC—7, through impulse distributor 269, to the card transfer and contact roll 87. The impulses thence flow through the brushes 109, pertaining to the multiplicand amount, such brushes being designated 109MC on Fig. 7a. The impulses then flow to the plug sockets of plug board 385. The customary plug connections are made at this plug board and connected to the lower plug sockets are three-blade contacts 386 and 387. These contacts are in the position shown for normal multiplying and are shifted to reverse position for checking purposes. As is customary the purpose of the three-blade contacts is to reverse the multiplier and multiplicand entries on checking, this being provided for by the cross-wiring 388. For multiplicand entries, the entries flow from the three-blade contacts 387 to the 390MC3 and 6 accumulator magnets, through contacts T—1—5 which are now in the position shown, and by parallel wiring, the multiplicand entries concurrently energize the 390MC1—2 accumulator magnets.

MULTIPLIER ENTRY AND CONTROL CIRCUITS

From the three-blade contacts 386, wiring extends directly to the 390MP receiving device magnets. For normal multiplying a plug connection 391 is established as shown in dotted lines between the plug sockets shown. The return circuit from the 390MC1—2 and 390MC3 and 6 magnets is through the closed relay contacts A—2 to ground. The return circuit from the 390MP magnets is via the plug connection 391 and through the closed A—2 relay contacts to ground. The relay contacts A—2 will be shifted by the energization of relay A as explained hereinafter, but during the entry of the MC and MP amounts upon a normal multiplying operation relay coil A is de-energized.

FORMING THE MULTIPLES

It has been previously explained that upon the card reading cycle, the amount of the multiplicand is entered into the MC1—2 and MC3—6 receiving devices. In the second machine cycle of the card feed cycle, the cam contacts FC—16 (Fig. 7d) close at the time shown in the timing diagram (Fig. 6) to energize relay coil T. The energization of relay coil T will shift the contacts T1—5 (Fig. 7a) to reverse position from that shown and will connect the 390MC3 and 6 accumulator magnets to a set of lines generally designated 443 (Figs. 7a and 7b), which lines extend to the MCRO—2 readout device. Emitter 265 is in constant operation and since an outgoing connection has been effected between the MCRO—2 readout and the 390MC3 and 6 accumulator magnets, double the amount of the multiplicand will be read out and entered into the MC3 and 6 receiving device. Following this entry of twice the multiplicand further entries will be cut off since relay T is de-energized at such time. There will now be available for derivation from the various MC readout devices, MC×1, MC×2, MC×3 and MC×6.

NUMBER OF COMPUTING CYCLES CONTROL

Wired in parallel with the 390MP magnets are a number of magnets generally designated 424 and individually designated 424u, 424t, 424h and 424th, the suffixes designating the related denominational order, units, tens, hundreds, etc. The 424 magnets are in two groups, that is to say there is a 424u magnet and another magnet designated 424ua and so on. The 424 magnets with the a suffix, are energized in the event that the multiplier amount in the related column contains a significant digit and in the event that such significant digit is of such numerical value classification as to require two entry cycles into the product receiving means. The 424 magnets without the a suffix, on the other hand, are energized in the event that the multiplier amount is a significant digit and irrespective of the numerical value of such digit. That is to say, there will be two computing cycles whenever the magnets with the suffix a are energized and at least one cycle whenever those without the suffix a are energized. It should be kept in mind, however, that there may be two cycles, with the magnets energized which lack the suffix a, but in order for there to be such two cycles, the magnets with the suffix must also be energized.

The 424 magnets without the a suffix are provided with a direct circuit to ground as follows, through wire 439, through the plug connection 391, through the A—2 relay contacts in the position shown.

The 424 magnets with the suffix a are provided with circuits to ground as follows: Magnets 424ua, 424ta, 424ha, 424tha are respectively connected via brushes 421u, 421t, 421h and 421th to the contact roll 420 and the return circuit to ground for these magnets is via the brush 422 which connects to the line 439 previously referred to. The 424 magnets which have direct connection to line 439 may become energized at any index point from 1 to 9 inclusive, but not, however, at zeros, there being no zero segment on impulse distributor 269. The other magnets of the 424 group, viz. those with the a suffix which find their circuit to ground through the commutator roll 420 may become energized only at the fourth, fifth, seventh, eighth and ninth index point positions.

CONTROL PRINCIPLES

There are several control conditions which the control devices of the machine must take into account. These conditions may be briefly grouped under three headings:

*First control condition.*—This is the condition which exists when a pair of MP digits is comprised of zeros in adjacent columnar orders.

*Second control condition.*—This is the condition which exists upon the presence of one or two digits in the pair requiring a single multiplicand multiple entry only. As typical of this assume multiplier amounts of, for example, 01 or 10 or 11 or the like.

*Third control condition.*—The third condition which exists upon the presence of one or two digits in a pair and in which either one or both digits require the entry of two multiplicand multiple components. As typical of this type of condition, assume pairs such as 09 or 99 or 90 or 91.

It will be appreciated that the aforesaid control conditions always pertain to a pair of columns. Accordingly, the cycle controller control is set up according to conditions existing in a pair of columns and not according to individual columnar conditions in a pair, that is to say, a single control can be used for two adjacent orders.

Before describing the details of the circuit arrangements affording the particular controls it may be mentioned that for setting up controls for condition 1 above, relay coils Yut and YYut will be energized. If the double zero condition occurs in the hundreds and thousands order the set up control would be brought about by the energization of Yhth and YYhth.

The set up control which is set up for control condition 2 above is brought about by the energization of Yut with this control condition existing in the units and tens order and by the energization of Yhth if the control condition exists in the hundreds and thousands orders. The effective control under the third condition above is this—neither Yut, nor YYut are energized for the control condition in the units and tens order and neither YYhth or Yhth are energized for such control condition in the hundreds and thousands order. For simplification of drawings, the control is only shown for a four order multiplier, but it will be appreciated that in practice the multiplier capacity will be very much larger.

In explaining the control conditions, the control would be assumed to occur in the units and tens orders. The action on the other orders is identical by pairs.

At this point it may be mentioned that the controls are set up upon the energization of relay coil V (Fig. 7d), which relay coil becomes energized during the second machine cycle of the card feed cycle upon closure of cam contacts FC—17 and at the time shown in the timing diagram. Energization of relay coil V causes closure of contacts V1—4 (Fig. 7a).

Set up for control condition one

Let it be assumed that the multiplier amount is such that double zeros occur in say the units and tens orders. Under this condition coils 424u, 424t, 424ua and 424ta will not become energized upon card analyzation. Accordingly, the related contacts 424u—1, 424t—1, 424ua—1 and 424ta—1 will not open up.

Accordingly, Yut and YYut will become energized.

The energizing circuit for Y$ut$ is from line 382 through 424$t$—1, 424$u$—1, through contacts V1—2 now closed, relay coil Y$ut$ and back to the other side of line 381. The energizing circuit for YY$ut$ is from line 382, through 424$ta$—1, 424$ua$—1, through V1 now closed through relay coil YY$ut$ and back to line 381.

Accordingly, with the aforesaid Y and YY magnets energized, their related contacts with the suffixes 2 and 3, shift to reverse position from that shown so that no calculations are made for the units and tens columns, but control is established for hundreds and thousands orders, for example. There is also a shift of their related contacts with the suffixes 4 and 5 so that no circuits are completed to the column shift magnets CS$u$ and CS$t$. Accordingly, with this control there is a cycle elimination for a pair of columns such as the units and tens columns. At this point it may be mentioned that the Y and YY magnets when energized, remain energized by the usual stick circuit which is established through cam contacts FC—15. The stick contacts are those with the suffix 1.

Set up for control condition two

It will be recalled that under condition 2, the Y$ut$ relay is to be de-energized and the YY$ut$ relay is to be energized when the control is set up. Assume a multiplier amount of 01 in the first pair. Under this condition, the only magnet of the 424 group which will become energized, is 424$u$. With 424$u$ energized, the 424$u$—1 contacts become open and accordingly, at the set up time when the V1—2 contacts close, it will be impossible to complete a circuit to Y$ut$ so that this relay will remain de-energized. Inasmuch as the amount was 01, the 424$ua$ and the 424$ta$ relay coils were not energized so that their contacts 424$ta$—1, 424$ua$—1 remain closed so that upon closure of the V1—2 contacts, relay coil YY$ut$ becomes energized. This completes the control set up for condition two.

It may be mentioned that the same ultimate control condition will be obtained irrespective of transpositions of the multiplier digits, i. e. the control condition would be the same for 01 or 10 and in fact for amounts such as 11. With relay coil Y$ut$ de-energized, the Y$ut$—2 and Y$ut$—3 contacts will remain in the position shown and readout relations will remain established to the units and tens order of MPRO. The Y$ut$—4 and Y$ut$—5 contacts will likewise remain in the position shown to permit the energization of the column shift magnets at the proper time.

Set up for control condition three

It will be recalled that under this control, neither YY$ut$ nor Y$ut$ become energized. Let it be assumed that the multiplier amount is 09. With this condition, magnet 424$u$ will become energized because there is some digit in the units order. Magnet 424$ua$ will also become energized because the digit is of such numerical value that two component entering cycles are required. With such magnets 424$u$ and 424$ua$ energized, the 424$u$—1 contacts and the 424$ua$—1 contacts are opened. Accordingly, at the set up time it is impossible to energize relay coils YY$ut$ and Y$ut$. With such coils both de-energized, the related contacts with the suffixes "2" and "3" and with the suffixes "4" and "5" do not shift. For further explanation, let it be assumed that the 9 be transposed with a zero so that the multiplier amount is 90. Under this condition, contacts 424$ta$—1 would be open and also 424$t$—1. Accordingly, neither relay YY$ut$ nor Y$ut$ would be energized. If the multiplier amount were say 99 all four of the contacts 424$u$—1, 424$t$—1, 424$ta$—1 and 424$ua$—1 would be open and there would be no set up of relays YY$ut$ and Y$ut$.

Assume now a multiplier amount such as 91. The 9 in the tens order would cause opening of 424$t$—1 and 424$ta$—1. The 1 in the units position would cause opening of 424$u$—1.

With the above contacts open, neither Y$ut$, nor YY$ut$ will become energized.

IMITATION OF COMPUTING CYCLES

According to the present invention, the computing cycles are initiated upon reset of the LP accumulator. LP reset is initiated and effected as follows. At the begininng of the second card feed cycle, the closure of cam contacts FC—11 (Fig. 7$d$) will cause energization of relay coil G. With G energized, three-blade contacts G—1 shift and interrupt the circuits to the start key contacts 275, but maintain a circuit to cam contacts FC—2. The energization of relay coil G will also close relay contacts G—2 and establish a stick circuit for coils G and H through the FC—2 contacts and through the card lever contacts 112. The card is fed in the customary manner and ultimately it passes to the punch closing card lever contacts 120 (Figs. 7$d$ and 2) causing energization of relay coil F and causing relay contacts F—1 (Fig. 7$d$) to shift to reverse position from that shown.

In starting up the machine, the punch racks are in extreme outer position and accordingly, punch control contacts P—1, P—3, P—4 and P—5 are closed. With contacts P—5 closed, relay coil K will be energized and relay contacts K—1 shifted to reverse position. With the F—1 relay contacts shifted in the manner previously explained and upon closure of cam contacts CC—6 a circuit will be established to the punch clutch magnet 194. This circuit is completed to the other side of the line through the P—3 contacts now closed and through the relay contacts K—1 which are now in shifted position. The energization of the punch clutch magnet will, in the customary manner, cause closure of contacts 197 which become latched closed by latch 198. This provides current supply for the punch driving motor Z—2. The card is now advanced in the usual way in the punch to the first punching position.

Referring again to the initiation of the computing cycles, it was stated that initiation was effected upon reset of the LP accumulator. With relay coils F and K energized in the manner previously explained, relay contacts F—2 and K—2 (Fig. 7$a$) become closed. Upon closure of cam contacts CC—2 current flows from line 383, through CC—2, through relay contacts K—2, contacts L—2, contacts F—2, through the 392LP reset magnet and back to ground. Energization of 392LP initiates LP reset. During LP reset the reset control contacts 272 (Figs. 1$a$ and 7$d$) close and a circuit is established to relay coil L causing the opening of relay contacts L—2 (Fig. 7$a$). This prevents repetition of LP reset. There is the usual stick circuit for relay coil L through the L—1 stick contacts, the circuit extending back to line through punch control contacts P—2 now closed. Contacts P—2 open up to de-energize coil L when the right-hand punch rack reaches its extreme left-hand position. Upon LP reset a circuit is established from the 382DC line (Fig. 7d), through the reset contacts 272, which become closed upon LP reset (contacts 270 also becoming closed at this time), to and through relay coils M and N and back to the 381 side of the D. C. line. The energization of relay coil M closes stick contacts M—2 to provide a stick circuit for relay coils M and N which stick circuit extends back to line through the MC reset contacts 274.

A machine operation will be explained with an assumed multiplier amount of 81. An assumed multiplicand amount may be say 11. The multiples of such multiplicand amount which will be available for read out will be the times 1 multiple, the times 2 multiple, the times 3 multiple, the times 6 multiple, or 11, 22, 33 and 66. With the multiplier amount of 81, the machine will be operating under the third controlling condition in the manner previously explained. Relay coils YYut and Yut will remain de-energized upon setup of the cycle controller. Their related contacts with the suffixes "2", "3", "4" and "5" will be in the position shown in Fig. 7a. With relay coil M energized, in the manner previously explained, relay contacts M—1 will become closed. With such contacts closed, a circuit is established from the 382 side of the D. C. line, through the M—1 relay contacts now closed, through relay contacts J—3 now closed and through the CC—3 cam contacts. It may be explained that the CC—3 cam contacts comprise a double pair of contacts. The circuit through one of these pairs of contacts extends to and through the Yut—3 and Yut—2 transfer contacts which are in the position shown because their associated relay coil is de-energized. Current supply is accordingly provided to the units and tens order sections of MPRO and inasmuch as the multiplier amount is 81, the X—1 relay magnet will be energized and the X—6a relay magnet will be energized. X—6a it will be noted, is wired to the 8 spot in the tens order of MPRO. There is a return circuit for the X—1 and the X—6a relay coils back to line 381.

Referring again to the CC—3 cam contacts, the circuit from the other pair of these contacts extends to and through transfer contacts Yut—5 and Yut—4, which are in the position shown and affords a circuit to the CSu and CSt column shift magnets. The energization of magnets CSt and CSu close their related stick contacts CSt—1 and CSu—1 to maintain these column shift magnets energized under control of cam contacts CC—8. With the aforesaid column shift magnets energized, their related column shift contacts (Fig. 7c) will become closed to provide entry circuits into LP and RP accumulators. It may be explained that for the LP accumulator, plug connections are established at plug board 445.

In the manner previously explained, the X—1 and the X—6a relay coils become energized. Accordingly, the X—1 (1—4) contacts and the X—6a (1—5) contacts (Fig. 7b) become closed. With such relay contacts shifted, circuit connections are established from the MCRO—6 and MCRO—1 respectively to LP and RP. With emitter 265 in operation an entry of 11 is made into the RP accumulator and an entry of 66 is made into LP. Since colum shift relay coil CSu is energized, its extra contacts CSu—3 (Fig. 7a) close and upon closure of cam contacts CC—7 current flows through the CSu—3 contacts to energize relay coil Yut (this relay coil previously having been de-energized). With Yut energized, its associated contacts with the suffixes "2", "3", "4" and "5" will shift to reverse position from that shown. After the 11 and 66 amounts have been entered into RP and LP, cam contacts CC—8 open to de-energize coils CSt and CSu. Near the end of this entry cycle just mentioned cam contacts CC—3 are closed. At this point, it may be mentioned that the MPRO readout is of dual type or form. Two separate readout segments are provided for each order. The shift of the Yut—3 and Yut—2 transfer contacts will now direct current to the second sections of the units and tens orders. In the tens order the brushes stand on 8 and if the wiring be traced, it will be noted that the X—2a relay coil will become energized. In the units order, it will be noted that with contacts Yut—2 shifted and with contacts YYut—2 non-shifted, there will be no circuit completed to X—1 because X—1 is not wired to the 1 segment spot in the units order second section of the readout. With X—2a energized as above explained, the X—2a (1 to 5) contacts (Fig. 7b) become closed and establish circuit connections to the doubling readout section of MCRO—2 so that upon operation of emitter 265, double the multiplicand, i. e. 22, is read out, and such amount is entered into LP.

It may be mentioned that the CSt and CSu column shift relay coils are again energized, the pick-up circuit being from cam contacts CC—3, through the Yut—4 and Yut—5 transfer contacts which are in shifted position and through the YYut—4 and YYut—5 transfer contacts which are in non-shifted position. After energization, the column shift relays are maintained energized by the stick circuit through their usual stick contacts CSu—1 and CSt—1 and cam contacts CC—8. Notwithstanding the fact that the column shift contacts associated with CSu (Fig. 7c) are closed, there are no connections through any of the contacts controlled by the X—1 to X—6 relay coils and accordingly there will be no entry into RP in the second computing cycle. Relay coil Yut in addition to having the contacts previously mentioned is provided with extra contacts Yut—6 (Fig. 7a). These contacts close upon energization of Yut and remain closed as long at Yut is energized. In the preceding cycle, however, the Yut—6 contacts are ineffective to establish a circuit therethrough because cam contacts CC—7 will close and re-open prior to the time that contacts Yut—6 become closed. However, in the cycle in which the amount 22 is entered into LP upon closure of CC—9 current flows through contacts Yut—6 through column shift relay contacts CSt—3 and to and through relay coil YYut to energize such coil. The energization of YYut will shift its associated contacts with the suffixes "2", "3", "4" and "5" to reverse position from that shown.

All entries for the complete multiplication of 11 by 81 have now been made and the multiplying computation is complete. However, if there were further pairs of amounts in the multiplier, the shift of contacts YYut—2 and YYut—3 would correlate the next paired section of MPRO for further computations. Also the shift of contacts YYut—4 and YYut—5 would completely cut out of circuit the CSu and the CSt column shift relays, but would place in circuit the CSh and CSth column shift relays. The operation will not be traced in detail for such further computations, since it follows the same general law of operation as has been previously described.

Under the assumption that there are zeros in the hundreds and thousands orders of the multiplier, relay coils YY*hth* and Y*hth* will become energized when the cycle controller is set up. Accordingly, at the completion of the computation, all of the transfer contacts controlled by the Y and YY relay coils, viz. those having the suffixes "3" and "2" will have become shifted so that upon the closure of cam contacts CC—3 in the last computing cycle relay coils AA and BB will become energized. With relay coils AA and BB energized their related AA—1 and BB—1 contacts will close and upon closure of cam contacts CC—2 current will flow through contacts N—2 now closed, through contacts J—2 now in the position shown, through the BB—1 and AA—1 relay contacts to energize relay coil 1—CR and the multiplier and multiplicand reset magnets 392MP and 392MCI—2 and 392MC3—6. Energization of 1—CR causes closure of relay contacts 1—CR—8 (Fig. 7c) and the establishment of a transfer circuit from RPRO to the 390LP accumulator magnets. Accordingly, upon operation of the emitter 265, the amount standing in RP is transferred over to LP. The energization of 392MP brings about MP reset in the usual manner and upon MP reset the shaft 423 in the ER unit (Figs. 1, 3 and 4) turns one-quarter of a revolution. This re-latches to closed position any of the relay contacts such as 424*ta*—1, 424*ua*—1 and 424*u*—1 which have been previously tripped open. The energization of reset magnets of 392MC—3 and 6 and 392MCI—2 brings about a reset of the storage means for the multiplicand multiples.

After the transfer of the amount from RP to LP upon the brush of the emitter 265 (see Fig. 7b) encountering the extra spot and with relay contacts 1CR—9 closed, there will be an energization of the 392RP reset magnet to bring about RP reset. During the reset of MCI—2, the reset contacts 274 open to break the stick circuit for relay coils M and N. Upon MCI—2 reset contacts 274*a* (Fig. 7d) close and cause energization of relay coil D. Relay coil D, when energized, is maintained energized by its stick circuit through contacts D—2 and cam contacts CC—1. Relay coil D upon energization, closes relay contacts D—1 (Fig. 7c) affording current supply to emitter 267 so that the amount standing in LP can be read out and entered into the SP accumulator. Suitable plug connections are made at the plug board 400 (Fig. 7c) to permit impulses to flow to the 390SP accumulator magnets. Upon MCI—2 reset, contacts 273 (Fig. 7d) also close and a circuit is established to energize relay coil C. With relay coil C energized, the relay contacts C—1 close to energize the card feed clutch magnet 384 to bring about card feed in the manner previously explained.

Early in the card feed cycle, cam contacts FC—4 (Fig. 7d) close, energizing relay coil B, closing stick contacts B—2 and providing a stick circuit for coil B, through LP reset contacts 271 (Fig. 7d). The energization of relay coil B closes relay contacts B—1. As is customary, a three-point switch 401 is provided which can be thrown to upper, lower or middle position. Such switch is thrown to the upper position for checking and punching, to the lower position to cut out punching and to the intermediate position for simple punching in connection with straight computing. The supplemental three-blade contact 386*a* is provided having its upper blade wired to the center contact of the E—1 group of relay contacts and having its intermediate blade wired to the center switch point of switch 401 and having its lower contact connected to the lower point of switch 401 and to the lower contact of the E—1 group of relay contacts. With switch 401 in intermediate position, the circuit to the punching mechanism is as follows. From the 382 side of the line, through relay contacts B—1, through the escapement contacts 215 on the punch, through switch 401, through the three-blade contact 386*a*, through the upper contact E—1 to line 406 which leads up (see Fig. 7c) to the common conducting strip 222 on the punch.

With current supplied to the common strip 222 and with brush 223 standing on the first of the spots 221 at the first product punching position, punching will commence, there being a readout from the related section LPRO and an energization of the punch selector magnets 407. The closure of relay contacts B—1 also affords current supply to contacts 408, these being the contacts which are closed by interposer action in the punch to supply current to the main punch operating magnet 409. Punching will continue until the complete product is read out and punched. When the punching is complete, the card carriage rack will escape to beyond the last column position in the customary way and punch control contacts P—5 will be closed, energizing relay coil K and shifting relay contacts K—1 to establish a circuit to the eject magnet 232. The punched card will then be ejected from the punch. A new computing operation will then be initiated for data pertaining to the succeeding record card. Such succeeding operation is initiated by the closure of relay contacts K—2 (Fig. 7a) and by the reset of the LP accumulator. The reset of LP initiates a new operation upon the following record in the manner previously explained. Upon LP reset, contacts 271 open to break the stick circuit for relay coil B and causes relay contacts B—1 to open the circuit to the punching operating magnets and to cut off the common strip 222 to the punch.

Summary products accumulator reset is provided for by depressing summary products reset key 410 (Fig. 7a). Upon depression of this key and upon closure of cam contacts CC—2, a circuit is established through relay contacts K—2 which will be closed, to the summary reset key contacts, through the 392SP reset magnet and back to ground.

RATE CARD MULTIPLICATION

In previous machines, particularly machines of the type exemplified by United States patent to Daly, No. 2,045,437, provision was made for effecting so-called rate card multiplication. In such previous machines, the multiplier entry receiving device was retained set up during the reading of detail cards and reset upon the entrance of a new rate card. In such machines furthermore, the cycle controller setup was broken down after each detail card was computed and then set up again under the control of the multiplier entry receiving device. In the present machine there is a modified control of the cycle controller for rate card operations. In the instant machine, in place of controlling cycle controlling relays direct from MPRO as heretofore, such cycle controlling relays are controlled from the unit ER and with rate card calculations the setting of the ER unit is maintained along with the setting of the MP unit throughout the complete series of computations pertaining to all detail cards which follow a rate card. In other words, the ER unit setting is maintained from master or rate card to master or rate card.

It may be explained that upon completion of a computation, all of the various Y relays such as Y*ut*, YY*ut*, Y*hth* and YY*hth* become energized and at the completion of each calculation pertaining to a single record, the set up of such relays is broken down by the opening of cam contacts FC—15 (Fig. 7a), which open up upon the feed of a new card. This action is used on rate card operations to break down the setup of the cycle controller following computation of each detail card. Accordingly, upon rate card computations, the cycle controller obtains its set up from the ER unit and after each detail card is computed, the cycle controller setup is broken down by the opening of cam contacts FC—15 upon feed of a new detail card, whereupon the cycle controller is again set up under the control of the ER unit which maintains its setting for all detail cards of a group.

It will be understood that the ER reset is under the control of MP reset in the manner previously explained and that the control of MP reset for rate card operations is substantially the same as the control for this purpose as shown in the Daly patent. Upon rate card multiplication, plus connections 391 and 396 (Fig. 7a) are removed. When a rate card, which is punched in one of the extra index point positions is about to pass under the brushes of the machine, the X index point position of the card will be in line with the X brush 106 (Figs. 2 and 7d) and will cause the establishment of the X brush circuit and energize the relay coil A, the circuit being completed through contacts FC—5 and relay contacts H—2 which are now closed (Fig. 7d). A stick circuit for relay coil A is established through contacts A—3 and cam contacts FC—3. The energization of relay coil A (Fig. 7d) shifts relay contacts A—2 and A—1 to reverse position from that shown on Fig. 7a. The shifting of relay contacts A—2 cuts off the return circuit from the magnets of the MC receiving devices and maintains a return circuit to ground from the 390MP magnets. Consequently, the amount of the rate or multiplier may be entered from the rate card, but no entry will be made from the rate card into the MC receiving devices.

When a multiplier amount is read from the rate card, a setup is made of the ER unit in the manner previously explained. The relay contacts A—1 establish a return circuit for the 392MP reset magnet so that the multiplier entry receiving device will become reset concurrently with the reset of the MC devices at the end of a run of computations on a number of detail cards. Such reset will occur prior to the reading in of a new multiplier into MP from the rate card. With rate card operations, provision is made to suppress punching of an imaginary product on the rate card. Referring to Fig. 7d, 411 are the usual list contacts which become closed during entry of an amount into MP. Upon closure of such contacts, during MP entry, relay coil J will become energized, closing stick contacts J—1 and providing a stick circuit through punch control contacts P—2 now closed.

Upon the energization of coil J and closure of contacts J—1, a circuit is also established to energize relay coil E, through punch control contacts P—4 now closed. The energization of E will close stick contacts E—2 and relay coil E will remain energized so long as J is energized and so long as punch control contacts P—4 are closed. The rate card passes through the card handling section of the machine into the punch and traverses therethrough to the position at which product punching would normally commence. This will have brought about the opening of punch control contacts P—5 which open before the opening of contacts P—4. The opening of punch control contacts P—5 will de-energize relay coil K so that contacts K—1 assume the position shown in the diagram (Fig. 7d). With contacts K—1 in this position, a stick circuit is established through relay coil E, through contacts E—2 now closed. This provides for the establishment of a stick circuit for E before punch control contacts P—4 open. Ultimately such punch control contacts P—4 open when the right-hand punch rack is in extreme left-hand position. With the parts in this position punch control contacts P—2 will open to break the stick circuit for relay coil J and at such time the 411 list contacts will have become reopened because such contacts close only momentarily during an entry of an amount from the rate card. The energization of relay coil E will have shifted relay contacts E—1 to reverse position from that shown in the diagram.

With the construction of the Daly patent, idle or dummy multiplying cycles ensue and rate card operations ensue following LH reset. With the instant machine, provision is made for not only eliminating such dummy multiplying cycles, but for directly bringing about MC reset following LP reset. This is provided for in the following manner. Relay coil J not only controls the contacts above mentioned, but it also controls contacts J—3 and J—2 (Fig. 7a). With relay coil J energized, this being the status of this relay towards the close of the LP reset cycle, such energization of J will open contacts J—3 and prevent any initiation of dummy multiplying under the control of MPRO when cam contacts CC—3 close. This control provides for the elimination of the dummy multiplying operations above mentioned.

To provide for MC reset in a machine cycle immediately following LP reset, the J—2 contacts are provided. Such J—2 contacts with coil J energized, shift to a reverse position from that shown in the diagram and upon closure of cam contacts CC—2 and with relay contacts N—2 closed a current path is afforded to 392MC—1, 392MC and 6 and 1—CR. The energization of the above mentioned MC reset magnets will bring about MC reset and although there is an idle attempted transfer of amounts from RP and LP this transfer is of no consequence because there is nothing in RP at this time. Upon reset of the MC receiving devices, a new card feeding cycle is initiated in the manner previously explained.

Upon feed of a following card, relay coil B becomes energized, closing relay contacts B—1 (Fig. 7d), establishing a circuit from the 382 side of the D. C. line, through the escapement contacts 215 on the punch now closed, through the switch 401 which is in the middle position, through contacts 386a, through contacts E—1 now in shifted position, via wire 412, direct to the main punch operating magnet 409 and back to the 381 side of the line. With the magnet 409 energized, the rate card escapes through the punch without any punching being effected thereon. Under this condition of operation the magnet 409 is successively energized and de-energized under the control of the escapement contacts 215. The rate card is ultimately ejected from the punch.

CHECKING

The present machine includes provision for checking, which need not be described in great detail. Provision is made for relatively reversing the entries of MC and MP as in previous machines. This is provided for by the switches 386 and 387 (Fig. 7a) and the cross-wiring 389 shown. By throwing these switches to reverse position the amount which was a multiplier on a previous run becomes the multiplicand and the amount which was the multiplicand becomes the multiplier. The switch 386 includes supplemental contact points 386a (Fig. 7d) which function in the customary manner on checking operations.

HALF-CENT PICKUP

The machine also includes provisions for the so-called half-cent pickup which functions in the same manner as the means provided for this purpose in the Daly patent above mentioned, i. e., plug sockets 413 and 414 (Figs. 7a and 7c respectively) etc.

MODIFIED EMBODIMENT

Before describing the modified embodiment of cycle controller, it may be explained that the machine having the cycle controller shown in the wiring diagram of Figs. 7a to 7d inclusive, operates according to the following law. The machine always computes by adjacent pairs and complete pairs. The machine is further so wired and arranged that in the event that two components are required to constitute a complete multiple of the multiplicand both components are directed into a single product entry receiving device. Considering now the modified embodiment of the cycle controller wherein Fig. 7aa is substituted for Fig. 7a and wherein Fig. 7cc is substituted for Fig. 7c with the complete wiring diagram arranged as shown below:

7aa
7b
7cc
7d

In this arrangement of cycle controller the basic law of operation as above set forth is modified first in the following manner. If multiple combining components are required for a given multiple of the multiplicand, the arrangement and wiring is such that one combining component will go into one result receiving device and the other combining component will go into the other receiving device. In considering the principles of operation of the modified form of cycle controller, the laws of probabilities are taken into consideration and use is made of the fact that there is a greater chance of a multiplier number occurring as follows, viz. 0022, than there is a case where the multiplier number might be 0202. In short, there is a greater chance that digits requiring a single component entry will be adjacent to one another in the multiplier than there is a chance of such digits occurring in columns separated by another column containing a zero or any other digit.

With the foregoing explanation of the reasons for the arrangement of the modified cycle controller, it may be explained that according to the second embodiment and inasmuch as the machine has two product entry receiving accumulators LP and RP into which entries may be concurrently directed the cycle controller is so arranged that the machine always attempts to make two entries concurrently, one into LP and the other into RP. This action occurs irrespective of the location of the various multiplier digits. Following such first operation wherein there is a concurrent entry into LP and RP, the accumulating operation repeats with concurrent entries, if possible, but if a remainder entry or entry of a single component becomes necessary, this remainder entry or multiple single remainder entries are made singly into RP or LP as the case may be. Such single entries are made following all dual entries and single entries in certain instances are made in successive machine cycles in succession, that is to say, the machine may compute certain computations wholly with concurrent entries into LP and RP. It may compute with several of such concurrent entries. It may also compute with the concurrent entries followed in some cases possibly by a single entry and in other cases there may be successive single entries one of which follows the other.

For certain calculations it is also possible that there may be single successive entries only. To illustrate a typical computation for a single concurrent entry assume the multiplier amount to be 0004. Here there would be an entry of the 3 multiple into RP and the 1 multiple into LP and such entries would be concurrent. Another typical computation of this sort would be a multiplier of 0022, where a 2 multiple would go to RP and a 2 multiple will go concurrently to LP. A typical calculation for a double concurrent entry would be for a multiplier of 0055. Here there would be the concurrent entry of the 3 multiple into RP and its associated 2 multiple into LP and in the following machine cycle there would be a concurrent entry of the 2 multiple into RP and its associated 3 multiple into LP.

A typical calculation for concurrent entries followed by a single entry is as follows—with a multiplier of 0043 there would be a concurrent entry of the 3 multiple into LP and RP and in the following machine cycle the 1 remainder multiple related to the 4 in the tens order would go into RP. As a typical illustration of a calculation where concurrent entries are made first followed by several successive single entries, consider the following MP amount of 4303. On the first machine cycle the 3 multiple pertaining to the units order would be entered into RP and concurrently therewith the 3 component of the 4 multiple pertaining to the multiplier digit in the thousands order would be concurrently entered into LP. On the following machine cycle, the 3 multiple pertaining to the hundreds order would be entered into RP and in the following machine cycle the remainder 1 multiple would be entered into RP. For a calculation involving single entries in successive cycles, assume a multiplier amount of 0202. Here the 2 entry pertaining to the units order would go to RP in one machine cycle and the 2 entry pertaining to the hundreds order would go in the following machine cycle. A rather extreme cycle condition in which the machine operates comparatively slowly for a combination of numbers which is seldom encountered, would be for a multiplier amount of 2727. Here the 2 multiple pertaining to the tens order 2 would be entered into LP concurrently and in the same machine cycle with the entry of the 6 component multiple pertaining to the 7 multiplier digit in the units order. On the following machine cycle, the 6 component of the hundreds order 7 is entered into RP concurrently with the entry of the 1 multiple of the units order 7 into LP. Following this machine cycle, there would be an entry of the 1 multiple of the hundreds order 7 into LP followed by a further machine cycle in which the 2 pertaining to the thousands order is entered into LP.

On the other hand, extremely rapid operation is obtained for some computations, such for example, as with a multiplier amount of 1236. Here the 3 and the 6 multiples are concurrently entered in the first machine cycle respectively, into LP and RP and in the second machine cycle the 1 and the 2 multiples are concurrently entered into LP and RP. There are, of course, numerous combinations of figures wherein the same speed of entry would be attained. As to speed of operation of the machine so far as entries into the products receiving means is concerned, neither the machine with the cycle controller disclosed in the main embodiment, nor the machine with the modified cycle controller ever operates slower than the partial products type of machine, wherein there is one entering cycle into the product receiving means for each significant digit.

In view of the probable occurrence and probable location of digits in the multiplier and their numerical magnitude the machines of the instant application are relatively faster on the average than partial products type of machines for the corresponding arrangement and numerical value of multiplier digits.

OPERATION OF MODIFIED EMBODIMENT

The manner of entering the multiplicand, the multiplier and the manner of setting up the multiplicand multiples need not be here repeated, since these operations are effected in the same manner as in the main embodiment. The cycle controller, however, is different in certain wiring connections. Magnets generally designated 424 are provided of which individual magnets 424u, 424ua, 424h and 424ha are wired the same as in the main embodiment previously described. Magnets 424t, 424ta, 424th and 424tha, are however, differently wired in that magnets 424ta and 424tha are wired so as to have direct connection to ground through circuit 439. These same magnets, it will be recalled in the other embodiment went to ground through the commutator. In the modified embodiment, magnets 424 t and 424th find their connection to ground through commutator 420.

The 424 magnets which have direct entries to line 439 may become energized at any index point through 1 to 9 inclusive, but not, however, at zero, there being no zero index segment on impulse distributor 269. The other magnets on the 424 group which find their circuit to ground through the commutator may only become energized at the 4, 5, 7, 8 and 9 index point positions. The magnets generally designated 424 have individual contacts as follows—424u—1, 424t—1, 424h—1, 424th—1 and 424ua—1, 424ta—1, 424ha—1, 424tha—1. These contacts are in individual parallel circuits extending to the Y cycle controller relay magnets. The establishment of such circuits is completed through the V1—8 relay contacts which are closed in the same manner as previously described for the other embodiment. It will not be necessary to trace the circuits in detail, but contacts 424u—1 for example are in circuit with magnet Yu and so on and contacts 424ua—1 are in circuit with cycle controller magnet Yua. It will be noted that the Y magnets are in two groups, viz. those lacking the a suffix such as Yu and those including the suffix such as Yua. The various Y magnets all have their stick contacts such as Yu—1, etc., the stick circuit being completed back to line through cam contacts FC—15. Before explaining a particular set of computing cycles, it may be mentioned that the entries controlled by the Y magnets without the a suffix always go to RP and those controlled by the Y magnets with the suffix always go to LP in this modified embodiment.

A typical problem will first be traced and for simplification it will be assumed that the multiplicand amount is 1. By the use of a 1 multiplicand amount, the multiplicand multiple components will be 1, 2, 3 and 6, which will aid in clarity of explanation. It will be assumed that the multiplier amount is 2279. Accordingly, since 9 and 7 require two entry cycles each, the coils 424u, 424ua, 424t, 424ta, will be energized. Since 2 and 2 require but one entry cycle each, 424h and 424tha will be energized, but 424ha and 424'th will not be since their circuits through commutator 420 (Fig. 7aa) are not complete at the "2" index point position. The 424u—1, 424ua—1, 424t—1, 424ta—1, 424h—1 and 424tha—1 contacts will be open. Since the 424ha and 424th coils are not energized, their contacts will remain closed and upon closure of VI—8 the circuits are completed from line 382 through 424th—1 and 424ha—1, through V4 and V7, to coils Yth and Yha respectively and back to line 381. Accordingly, upon closure of the V1—8 relay contacts the Yth and Yha coils only will be energized.

The fact that Yu and Yua and Yt and Yta do not become energized, sets up a control condition which is indicative of the fact that there are significant digits in both the units and tens column of the multiplier and also indicates that such digits are of such a numerical magnitude that two component entries are required in the calculations pertaining to them. The fact that Yh and Ytha do not become energized and that Yth and Yha do become energized, indicates that in the hundreds and thousands column there are significant digits and that such significant digits require the entry of only a single multiple for each one.

If there is a zero in a column the corresponding Y relay coils become energized. If there is a significant digit in the column a Y relay coil, either with or without the suffix a or both Y relay coils become energized.

Generally control conditions which the cycle controller must take into account are the following:

(1) The presence of a zero in a column.

(2) The presence of a significant digit in a column requiring only one multiple.

(3) The presence of a digit in a column requiring the entry of two multiples.

The control for control condition 1 is as follows: Both the Y magnet lacking the suffix and the Y magnet with a suffix, are energized when there is a zero in a column.

The control conditions for condition 2 above, are somewhat complex. For the units column in the multiplier if a significant digit is present, requiring one cycle, Yu will not be energized and Yua will become energized, but for the next higher column the control relation is reversed, that is Yt will become energized and Yta will not become energized. For the hundreds order there is another reversal, that is, if there is a significant digit requiring one cycle, Yh will not become energized and Yha will become energized and for the thousands order for such condition Yth would become energized and Ytha would not become energized.

Taking now control condition 3, here the presence of a digit in the MP amount requiring two multiples effects setup of controls as follows: For the units order with such two multiple requiring digit, Yu and Yua will not be energized. The same relation of energization and de-energization applies to the higher order columns, for example, for the tens order Yt and Yta are not energized for digits requiring two multiples.

A typical computation will now be traced and for such computation it will be convenient to assume a multiplicand amount of 1 and there will be assumed a multiplier amount of 2279. With the multiplier amount of 2279 the 424 relay coil controls are such and their related contact controls are such that Yth is energized, Yh, Yt and Yu are de-energized and Yha is energized and all of the other Y magnets with the suffix a are de-energized.

The various Y relays have shifting contacts of the usual three-blade type controlled thereby, these having suffix designations "2" and "3". The purpose of the contacts with the "2" suffix is to direct circuits selectively into MPRO for the purpose of taking the reading from the proper order or orders thereof. The purpose of the three-blade contacts with the "3" suffix is to selectively energize the proper column shift relay coils.

With Yha energized, the Yha—2 transfer contacts will be shifted and the Yha—3 transfer contacts will be shifted to a reverse position from that shown in Fig. 7aa. Also with Yth energized, the Yth—3 transfer contacts will be shifted and the Yth—2 transfer contacts will likewise be shifted. As in the other embodiment the multiplier readout MPRO is of dual type with two sets of readout segments for each column of the multiplier and the wiring relations from the Y contacts with the "2" suffix are as shown.

At the proper time in the cycle when computing is to commence and upon closure of cam contacts CC—3, current will be directed through contacts Yu—2 in non-shifted position down to the 9 segment spot in the units order of MPRO and a circuit will be completed out to the X—6 selecting relay coil. Concurrently therewith another circuit will be completed from contacts Yua—2 which are in non-shifted position, down to the other section of the units order of MPRO, out via the brush on the 9 spot, through the other segment to energize selecting relay coil X—3a. At the time this operation is taking place, since contacts Yu—3 and Yua—3 are not shifted, the CSu and CSua column shift relay coils will become energized. Thereafter the usual multiple entries take place, the 6 multiple entry being placed in RP and the 3 multiple entry being placed in LP.

In passing, it may be mentioned that CSu—1, etc. are the stick circuits for the column shift relay coils and such column shift relays are provided with supplemental contacts with a suffix "3". Such supplemental contacts have the usual purpose of energizing their related Y magnets during the computing cycles.

The effect of the energization of Yu and Yua under the control of the supplemental CSu—3 and CSua—3 contacts and cam contacts CC—7 is to shift their related three-blade contacts with the suffixes "2" and "3". Accordingly, upon the next computing cycle when cam contacts CC—3 again close, current will flow through the Yt—2 contacts down to the tens order of MPRO, out via the brush on the 7 spot to energize relay coil X—1 to control a times 1 entry into RP and concurrently therewith current flows through contacts Yta—2 to the 7 spot to energize the selecting relay coil X—6a to direct the entry of a 6 multiple into LP. During this computing cycle Yt and Yta are energized under the control of the supplemental contacts on the column shift relays CSt and CSta. On the following computing cycle, it being recalled that Yh was not energized on original setup, upon closure of CC—3 current will flow through contacts Yh—2 in non-shifted position as shown down to the 2 segment spot in the hundreds order of MPRO and out via wire to energize the X—2 multiple selecting relay coil. Concurrently with this operation since Yh—3 is not shifted, the CSh column shift magnet is energized. Accordingly, the hundreds denominational relationship times 2 multiple is entered into RP.

Now referring to the Yha relay coil, such magnet was energized on setup of the cycle controller. Ytha was not, however, energized, and accordingly with coil Yha energized, contacts Yha—2 are in shifted position. Upon closure of cam contacts CC—3, current flows through the Ytha—2 contacts in non-shifted position down to the thousands order of MPRO out via the brush on the 2 spot and over to energize the X—2a relay selecting coil. Energization of X—2a directs the entry of the times 2 multiple into LP and inasmuch as contacts Yha—3 are shifted and contacts Ytha—3 are non-shifted, the CStha column relay coil will be energized so that the multiple directed into LP is directed in thousands columnar relation therein. Entry cycles into the accumulators RP and LP are now complete. Furthermore, all of the Y relay coils at the completion of computing are energized so that in the manner as described for the previous embodiment there may be a subsequent RP to LP transfer and reset of the MP and MC1—2 and MC3 and 6 receiving devices.

It may be explained that with the present alternative embodiment, it is possible that computations involving entries into RP be completed before entries are completed into LP or vice versa. Provision must be made for holding MP and MC reset and RP to LP transfer until entries are complete into both sections. This is provided for in the instant embodiment by the BB and AA relay coils which have relay contacts BB—1 and AA—1 disposed in the initiating circuit for MP and MC reset and for energization of the 1—CR relay coil. This control provides that entries into both sections must be completed before a further operation can take place.

The illustrated computation just traced shows how three computing cycles, i. e. directed entries, into the RP and LP receiving devices, are required for a 4 digit multiplier with a number such as 2279. If the multiplier values were taken such as for example 7979, there would be four directed entry cycles. Likewise if the amount were 2222 there would only be two directed entry cycles and the same would apply for amounts such as 3262. It seems unnecessary to trace the further numerous manners in which entries are directed under various combinations of multiplier digits.

The law of operation for the cycle controller has been set forth and if this law is followed the number of cycles can be determined for any arrangement of multiplied digits.

It should be noted in connection with both embodiments of cycle controllers herein disclosed that the saving of machine time is effected by the provision of means in the cycle controllers and in the control selecting circuits for saving machine time by taking into account the value of multiplier digits and utilizing such control to determine first whether two columns of the multiplier can be entered in one machine cycle or not, that is to say, the instant cycle controller takes into account the value of a multiplier digit and saves machine time when the value of such digit permits time to be saved.

It is to be further noted that in the instant machine the cycle controller which obviously primarily comprises the 424 relay coil control and the ER section receives its setting directly from the card and that such cycle controller under direct control from the card also takes into account the value of the multiplier digits to selectively control the number of computing cycles of the machine and in a different way than does the cycle controller according to the main embodiment. The multiplier entry receiving device is utilized merely for the selection of the multiple selecting relays and it has no control whatsoever over the cycle controller.

As regards the modified embodiment of cycle controller it seems unnecessary to trace supplementary operations such as summary product accumulation, rate card operations and checking since these operations occur in the same manner as in the main embodiment. It is further unnecessary to trace the punching of products and re-initiating of new cycles, etc. according to the alternative embodiment of cycle controller.

GENERAL MACHINE TIMING

The general timing of the machine is in accordance with the timing of the machine of Daly patent above referred to. It may be noted, however, that the building up of multiplicand multiples by transfer from receiving device to receiving device occurs during the second machine cycle of the card feed cycle shown on Fig. 21a of the Daly patent. Following this second machine cycle of the card feed cycle of the instant machine, there is an LP reset cycle followed by the computing cycles in which multiples are directed into the product receiving devices. After such cycles are completed, there is an RP to LP transfer cycle during which cycle the multiple receiving devices and the multiplier receiving device are reset.

Fig. 8 is a diagrammatic view which in a simplified manner shows a routing of the factor entries from the card into the respective receiving devices and the manner in which control of the cycle controller is afforded directly from the card. This view also shows diagrammatically the manner in which multiples of the multiplicand are built up or formed upon the representing means therefor, viz. the various MCRO readouts. The view also shows diagrammatically the control of multiple selection by MPRO and the routing of the entries under the control of MPRO into the LP and RP receiving devices. There is also indicated diagrammatically the fact that the cycle controller controls the number of multiple entry cycles into the result receiving means. The gathering together of the results in LP are also indicated and finally there is diagrammatically indicated the recording back of the result upon the card.

Figs. 9 and 10 are diagrams indicating the spot wiring of the MPRO readout and the dual sections thereof. The views also contain legends L and R, indicating left and right destinations of the multiples into LP and RP. Fig. 9 shows the spot wiring of MPRO in the main embodiment, viz. Figs. 7a, 7b, 7c and 7d. In this figure it will be noted that the spot wiring is relatively the same for the different denominational orders in the main and supplementary readout sections in each order and the view further shows that multiple entries selected under the control of either of the main or supplementary sections of the units order always go to RP, while those from both sections of the tens order always go to LP and so on. Accordingly, with this readout control, single and double components always go to a common section of the result receiving means for each order of the multiplier.

Fig. 10 shows the spot wiring for MPRO which is used in the modified embodiment, Figs. 7aa, 7b, 7cc and 7d. Here it will be noted that the spot wiring is reversed or alternated for the main and supplemental readout sections for each successive order. This view also indicates the ultimate destination of the multiple entries or multiple components respectively into RP or LP or into both devices. With this form it will be noted that with single complete components, single complete components in the units order always go to RP and that the small combining components go to LP. There is the same entry relation into RP and LP in the hundreds order, but in the tens and thousands orders, the entry relations are reversed, that is to say, in the tens multiplier order the small combining components go to RP, while the single components and the other combining components always go to LP.

Fig. 11 shows six typical computations lettered I to VI, inclusive, as performed by the main embodiment of the invention, Figs. 7a, 7b, 7c and 7d. For simplification in this view the multiplicand is assumed to be 1 and various possible combinations and relations of multiplier digits are shown in the successive problems. Each view in each instance, shows the routing of the multiple entries into LP or RP as the case may be and the various views are also such that the number of multiples to be entered are shown and each example also shows the number of successive multiple entry cycles into the result receiving means under the directed control of the cycle controller. These computation views also diagrammatically indicate that the control of multiple selection and entry routing into RP or LP is by means of MPRO.

Fig. 12 is a view like Fig. 11, but relates to typical computations as performed by the modified embodiment, Figs. 7aa, 7b, 7cc and 7d. The Fig. 12 view shows typical computations lettered from I to VIII, inclusive. It will be noted that the number of successive entry cycles for all, except the last computation, is 2 or less than 2. The VIII computation requires three multiple entry cycles which are effected in the manner indicated. In both Figs. 11 and 12, multiple entries shown on the same line are effected concurrently and the showing of multiples on successive lines indicates that successive entries are required.

In general it may be stated that the MPRO readout for both embodiments is so wired to provide for the required selection of a multiple or of a plurality of multiples or a multiple and a component or a plurality of components and that these readout devices also control the routing of selected entries into the result receiving means. The cycle controller takes into account the value of the multiplier digits and controls single or successive multiple entry cycles into the result receiving means. The cycle controller of the main embodiment operates by successive pairs of columns and the cycle controller for the modified embodiment operates individually by columns, irrespective of the location of a column. In other words, the cycle controller for the modified embodiment does not provide a paired control, but the control is individual by each individual column.

Referring to the problems shown in Figs. 11 and 12, with both embodiments, if a pair of zeros occurs in adjacent columns as per problem I, all multiple entry cycles are skipped and machine operating time saved. Likewise for problem II, for both embodiments, if the multiplier comprises a zero and a direct multiple such as 01, there is a single entry of the direct multiple into one section of the result receiving device. With problem III for both embodiments where there is a direct multiple in two orders such as 26, there is a concurrent entry of each multiple into the sections of the receiving device. For problem IV, involving a double component multiple and a zero, such as 09, the mode of operation of the main embodiment is to enter the component multiples in succession in one section of the entry receiving device. With the modified embodiment, both components are entered concurrently into the sections of the result receiving device. For problem V, involving a direct multiple and a combining multiple such as for a multiplier amount of 19, the mode of operation of the main embodiment is to enter the direct multiple into one section of the receiving device concurrently with the entry of one component of the other combining multiple into the other section of the receiving device. Then on the following cycle the remaining component is entered. For the modified embodiment components of the double component multiple are entered concurrently into the sections of the receiving device followed by a single entry of the direct multiple upon the following multiple entry cycle or in the alternative, the single direct entry is effected concurrently with the entry of one of the components followed on the next cycle by the entry of the other component. For problem VI involving double components in multiple orders such as 99, the mode of operation of the main embodiment is such that one component of each of the two multiples is entered concurrently followed by the entry of the remaining components concurrently and for the modified embodiment the two components for one multiple are entered concurrently followed by the concurrent entry of the two components for the second multiple.

For problem VII for the modification, involving two direct multiples separated by a zero such as 101, one of the direct multiples is entered on one cycle and the other direct multiple is entered upon a following cycle.

For problem VIII for the modification involving two direct multiples separated by a digit requiring component multiples such as 191 on the first entry cycle, one of the components is entered concurrently with one of the direct multiples and on the next cycle the remaining component is entered and on the third cycle the remaining direct multiple is entered.

What we claim is:

1. Entry routing and transfer control devices for the multiplying mechanism of a multiplying machine which machine provides digital multiples of a multiplicand upon representing devices therefor and transfers selected multiples from said representing devices through column shift means to a pair of result receiving means in one or more successive multiple entry cycles of such receiving means, in combination, a multiplier factor manifesting means, means for entering a multiplier factor therein, means including digit value classification and zero ascertaining and detecting means controlled by elements of the multiplier factor centering means, cycle control means set up under control of said last named means according to the classification of a significant multiplier digit entered in one order with a zero in another order of a pair of orders of the multiplier or according to two significant multiplier digits entered in a pair of orders of said multiplier manifesting means for bringing about a single or successive entering cycles of the result receiving means, column shift means, selectively operable connecting devices for connecting any one representing device through column shift means to either or both receiving means or for connecting any one representing device through column shift means to one receiving means and any other representing device through column shift means to the other receiving means, and means for selectively controlling the last mentioned connecting devices under the control of the multiplier factor manifesting means according to a manifested significant multiplier digit in one order or according to significant multiplier digits in a pair of orders of an entered multiplier, said selected connecting devices being brought into operation under the control of the cycle control means and said column shift means being selected for and brought into operation by said cycle control means.

2. In a multiplying machine comprising devices for predetermining multiplicand multiples including multiplicand receiving means and a plurality of settable representing devices from which only four predetermined different complete multiplicand multiples based upon a received multiplicand may be derived, and further comprising result calculating mechanism including multiplier factor manifesting means and result receiving means comprising a pair of accumulators adapted to accumulate multiples selectively derived from said representing devices, under control of the manifesting means according to the digital values of the multiplier thereon to thereby effect multiplication for all multiplier digits, means to cause a selected multiple or multiples to be transferred from the representing devices to the result receiving accumulating means in one or a succession of multiple entry cycles, and selectively operable column shift means, including in combination selectively operable connecting devices for connecting any one representing device through the column shift means to either or both receiving means or for connecting any one representing device through the column shift means to one receiving means and any other representing device through the column shift means to the other receiving means, means for selectively controlling the last mentioned connecting devices under the control of the multiplier factor manifesting means according to a manifested significant multiplier digit in one order or according to significant multiplier digits in a pair of orders of an entered multiplier, and means including devices for detecting within which two different classes of digits the digital values in a pair of orders of the multiplier fall to bring the selected connecting devices into operation and to select and bring into operation said column shift means in one cycle of the result receiving means when the digital value in an order or a pair of orders fall in a class requiring a single cycle and to bring the selected connecting devices into operation and to select and bring into operation the column shift means in two successive cycles of the result receiving means when the digital value or values in an order or a pair of orders fall in a class requiring two cycles whereby multiple transfers for multiplication by any multiplier digits in a pair of orders may be completed in one or at the most two multiple transfer cycles.

3. In a multiplying machine comprising devices for predetermining multiplicand multiples including multiplicand receiving means and a plurality of settable source means from which only four predetermined different complete multiplicand multiples based upon a received multiplicand may be derived, and further comprising result calculating mechanism including multiplier factor manifesting means and result receiving means adapted to accumulate multiples selectively derived from said source means under control of the manifesting means according to the digital values of the multiplier thereon, means to cause a selected multiple or multiples to be transferred from the source means to the result receiving accumulating means in one or a succession of multiple entry cycles, and including in combination means for entering a multiplier factor, means including multiplier digit value classification ascertaining and detecting means under control of elements of the multiplier factor entering means and cycle control means set up under control of said last named means with variable settings depending upon whether the digital value classification of a significant multiplier digit entered in an order or a pair of significant digits entered in a pair of orders are such as to require only a single multiple transfer cycle or to require successive multiple transfer cycles, entry routing means between the multiple source means and the receiving accumulators, including output routing means from the source means and input routing means to the receiving accumulators which input routing means include column shift means, means controlled by the multiplier factor manifesting means according to a significant digit manifested in an order thereof or two significant digits manifested in a pair of orders thereof to select the required output routing means for operation in one or more successive multiple transfer cycles, and means controlled by the cycle control means for bringing into action the selected output routing means and for selecting and bringing into action the required input routing means in one multiple transfer cycle or in a succession of such transfer cycles.

4. In a multiplying machine comprising devices for predetermining multiplicand multiples including multiplicand receiving means and a plurality of settable source means from which only four predetermined different complete multiplicand multiples based upon a received multiplicand may be derived, and further comprising result calculating mechanism including multiplier factor manifesting means and result receiving means comprising a pair of accumulators adapted to accumulate multiples selectively derived from said source means under control of the manifesting means according to the digital values of the multiplier thereon to thereby effect multiplication for all multiplier digits, means to cause a selected multiple or multiples to be transferred from the source means to the result receiving accumulating means in one or a succession of multiple entry cycles, including in combination a cycle controller including cycle determining means for determining one or a succession of multiple entry cycles of the result receiving means for computations pertaining to a significant multiplier digit in an order or in each of a pair of orders, means for setting up such determining means according to digital value classification in a multiplier order or a pair of orders, said means including means to enter a multiplier and cooperating control means which comprises digital value classification ascertaining and detecting means, multiple entry routing means between the multiple source means and the result receiving accumulating means, including multiple entry routing means controlled by the multiplier factor manifesting means in accordance with a numerical value of multiplier digits in one or each of two orders, said multiple entry routing means being called into operation by the cycle determining means of the cycle controller, and other multiple entry routing means controlled directly by the said cycle determining means, said cycle determining means having means controlled thereby to selectively control the number of successive multiple transfer cycles into the result receiving means for computations which involve a multiplier digit in a single order or in each of a pair of orders.

5. Entry routing control devices for a multiplying machine with multiplying means wherein dual product receiving means receive multiplicand multiples by transfer from representing devices for said multiples, said multiplying machine, including transfer causing means and means to operate said product receiving means in one or a succession of multiple entry cycles, said devices including in combination a multiplier factor manifesting device, a cycle controller, means for entering a multiplier in said manifesting means and for controlling the setting up of the cycle controller, said cycle controller including digit value classification and zero ascertaining and detecting means, control means which are selectively set under the conjoint control of said last named means and under the control of the factor entering means according to digital value classification and zero relations in a pair of orders of the multiplier according to whether none, one, or more than one successive entry cycles of the product receiving means have to be made to effect a computation pertaining to said pair of orders, a plurality of sets of entry routing means between the multiple representing means and the product receiving means, one set being controlled conjointly by said control means of the cycle controller and also selectively by the multiplier factor manifesting means and the other set being controlled selectively by said control means of the cycle controller for the purpose described.

6. A multiplying machine with multiplying means which effects multiplication by first representing four multiples of an entered multiplicand and which thereafter accumulates multiples selected according to the digits of an entered multiplier by transfer from selected representing means to accumulating means and including in combination therewith a cycle controller with means for setting it up and controlling its set up comprising multiplier factor entering means and digit value classification ascertaining and detecting means, said cycle controller including a pair of control means for each order of the multiplier, one of which is set up if a significant multiplier digit corresponds to one of the represented multiples and both of which are set up if a significant multiplier digit does not correspond to any represented multiple, and cycle control means controlled from the aforesaid control means depending upon whether one or both are set up to bring devices into operation in the multiplying machine which determine one transferred entry or two transferred entries.

7. The invention according to claim 6 wherein means are provided for controlling the pair of control means so that neither are set up when the multiplier digits in a pair of orders are zeros, whereby said cycle control means suppresses multiple transfer operations.

8. In a multiplying machine the combination of means to enter a multiplier and a cycle controller, comprising means controlled by said entering means for detecting into which of two classes of digits the significant digits of the multiplier fall and means for detecting zeros in multiplier orders, and comprising further a plurality of control elements for each pair of multiplier orders conditioned according to one setting when zeros occur in both orders of a pair, conditioned according to another setting when one or both digits of a pair fall into one class, and conditioned according to a still different setting when either one or both digits of the pair fall into another class.

9. In a multiplying machine having means to enter a multiplier factor and including in combination, a cycle controller having digital value classification detecting means and zero detecting means and control elements controlled by said last named means and by the entering means to be set with one setting upon the presence of zeros in a pair of multiplier orders and to be set with another setting upon detection of digital values of one classification in an order or pair of orders and to be set with still another setting upon detection of digital values of another classification in an order or a pair of orders of the multiplier.

10. A machine according to claim 9 wherein the multiplier entering means enters a plurality of pairs of multiplier digits and wherein a separate group of control elements of the cycle controller is provided for each pair of the plurality of pairs of multiplier orders.

11. A machine according to claim 9 wherein product receiving means and means for operating the same in one or a succession of entering cycles are provided and wherein determining means are provided for determining one or a succession of entering cycles, said last named means being under the control of the control elements of the cycle controller to bring about one entering cycle for one classification of digital values of a multiplier factor in one or two orders and successive entering cycles for another classification of digital values of a multiplier factor in one or two orders of the multiplier.

12. A machine according to claim 9 wherein column shift devices are provided and wherein the control elements of the cycle controller according to their variable setting selectively control said column shift devices.

13. In a multiplying machine comprising devices for predetermining multiplicand multiples including multiplicand receiving means and a plurality of settable source means from which predetermined different complete multiplicand multiples based upon a received multiplicand may be derived, and further comprising result calculating mechanism including multiplier factor manifesting means, means for entering a multiplier factor therein and result receiving means comprising a pair of accumulators adapted to accumulate multiples selectively derived from said source means through routing means under the selective control of the manifesting means according to the digital values of the multiplier, means to effect entry or entries of multiples under control of the source means into the result receiving means in one or in a succession of multiple entry cycles, including in combination, a cycle controller for the result calculating mechanism with control devices for controlling the number of entries to be made successively into the result receiving means in accordance with values of two multiplier digits and to selectively provide for one multiple entry cycle or more than one entry cycle depending upon whether the significant multiplier digits in two orders are of one value classification or a different value classification, and means for controlling said control devices of the cycle controller including the multiplier factor entering means and detecting means to detect the classification of the numerical values of significant digits in two significant digit containing columns of the multiplier upon the entry thereof in the manifesting means whereby said control devices are variably set up and whereby the number of entry cycles is selectively varied according to the numerical value classifications of said multiplier digits in two columns of the multiplier.

14. The invention according to claim 13 wherein separate control devices are provided for each order of the multiplier and wherein the detecting means and the multiplier entering means controls said separate control devices individually for each order of the multiplier containing a significant digit.

15. The invention according to claim 13 wherein separate sets of control devices are provided for pairs of orders of the multiplier, one set being provided for each different pair and wherein the detecting means and the multiplier entering means controls said sets of controlling devices for each pair of orders of the multiplier containing significant digits.

16. The invention according to claim 13 wherein record responsive means are provided for controlling entries in said multiplier factor manifesting means and wherein certain of said control devices are separately controlled directly from said record responsive means.

17. In a multiplying machine wherein products are computed by accumulating precomputed sub-products which may involve single or double component entries for each multiplier digit, including in combination, a cycle controller, said cycle controller including selectively conditioned elements, record reading means, means for detecting whether the digit values read by the reading means require single or double component entries, said reading means and detecting means conjointly controlling said elements of the cycle controller.

18. A cycle controller for a record controlled machine including selectively conditioned elements which are to be conditioned in one relationship when digit values derived from a record fall into one classification and in a different relationship when digit values derived from a record fall into another classification, record reading means, means for detecting in which of two classes of values the digits read by the reading means fall, said reading means and detecting means conjointly controlling said elements of the cycle controller.

19. A cycle controller for a record controlled multiplying machine including selectively conditioned elements which are to be conditioned in different relationships according to which different classification digits derived from a record fall, record reading means, means for detecting into which classification amounts read by said reading means fall, said reading means and detecting means conjointly controlling said elements of the cycle controller.

20. In a multiplying machine, means for forming and representing an incomplete series of multiplicand multiples upon multiplicand entry, multiplier receiving means, means for effecting entries therein, dual product forming accumulators for receiving the multiplicand multiples represented by said representing means, means for effecting entries in said receiving accumulators, means for controlling said entry effecting means from the denominational orders of the multiplier receiving means in accordance with multiplier digit values thereon, detecting means for determining whether the values of the several multiplier digits correspond to available multiplicand multiples, or require component multiple entries, cycle control means comprising devices controlled jointly by elements of the multiplier entry means and said detecting means for determining the number of cycles required for a given multiplier entry, and control means conditioned by said cycle controller to enable two denominational orders of said multiplier receiving means to control said entry effecting means to perform concurrent multiple entries in the dual product forming means in a single entry cycle either as complete multiples or as components thereof.

21. A machine according to claim 20 wherein the cycle control means conditions its control means to enable said two denominational orders of the multiplier receiving means to control said entry effecting means for two successive concurrent multiple entries in the dual product accumulators when each of the two multiplier digits requires component entries.

22. In a multiplying machine comprising devices for predetermining multiplicand multiples including multiplicand receiving means and a plurality of settable source means from which only four predetermined different complete multiplicand multiples based upon a received multiplicand may be derived, and further comprising result calculating mechanism including multiplier factor manifesting means and result receiving means comprising a pair of accumulators adapted to accumulate multiples selectively derived from said source means under control of the manifesting means according to the digital values of the multiplier thereon to thereby effect multiplication for all multiplier digits, means to cause a selected multiple or multiples to be transferred from the source means to the result receiving accumulating means in one or a succession of multiple entry cycles, including in combination, multiplier factor entering means, a cycle controller for the result calculating mechanism, said cycle controller including significant digit value classification ascertaining and detecting means controlled by elements of the multiplier factor entering means and cycle determining control means selectively set under control of said last named means according to the digital value classification of multiplier digits in two different columns, means brought into operation by the cycle determining control means and controlled by the multiplier factor manifesting means according to significant digit values manifested in two different orders thereof, to select the required multiple or multiples and route the entry of the same into the result receiving accumulating means, said last named means tending to select two multiples for entry in one multiple entry cycle if the multiplier digit values in two orders require such selection, and tending to enter all multiples called for by the multiplier digit values in two orders in not more than two successive entry cycles, and column shift means controlled by the cycle determining control means to further route the multiple entries into the receiving accumulating means.

23. A multiplying machine having multiplying mechanism comprising representing means for forming and representing not more than four different multiples of a multiplicand, result receiving means into which multiplicand multiples are entered from the representing means under the selective control of multiplier factor manifesting means and in accordance with the digital values of multiplier amounts manifested thereon, said result receiving means being of the dual section type with means for transferring amounts from section to section, including in combination, entry causing and cycle controlling means and selecting and entry routing means controlled by the multiplier factor manifesting means to take into account numerical values of manifested multiplier digits in two orders for selecting and routing a multiple or multiples, determined by the multiplier digit values which multiples may constitute either complete multiplicand multiples or components thereof, into the result receiving means, said last mentioned means cooperating with the aforesaid entry causing means to cause concurrent entries into the dual result receiving means when the values of the multiplier digits determine a concurrent entry or to cause a single entry in one of said result receiving means when the values of the multiplier digits determine such single entry, whereby entry time may be minimized with attendant simplicity and minimizing of the number of multiple representing means.

24. A machine according to claim 20, wherein the devices controlled jointly by the elements of the multiplier entry means and by the detecting means are individual to each column of multiplier digits and wherein the control means conditioned by the cycle controller also enables the entry effecting means to perform concurrent entries in the dual products forming means in a single cycle of components related to a single multiplier digit which single multiplier digit requires component entries.

25. In a multiplying machine, means for forming and representing an incomplete series of multiplicand multiples upon multiplicand entry, multiplier receiving means, means for effecting entries therein, dual product forming accumulators for receiving the multiplicand multiples represented by said representing means, means for effecting entries in said receiving accumulators, means for controlling said entry effecting means from the denominational orders of the multiplier receiving means in accordance with multiplier digit values thereon, detecting means for determining whether the values of the several multiplier digits correspond to available multiplicand multiples, or require component multiple entries, cycle control means comprising devices controlled jointly by elements of the multiplier entry means and said detecting means for determining the number of cycles required for a given multiplier entry, and control means conditioned by said cycle controller to enable either one order or two orders of said multiplier receiving means to control said entry effecting means to perform concurrent multiple entries in the dual product forming means either of components related to one order of the multiplier or of a pair of complete multiples related to two orders of the multiplier respectively.

26. In a multiplying machine, means for forming and representing an incomplete series of multiplicand multiples upon multiplicand entry, multiplier receiving means, means for effecting entries therein, dual product forming accumulators for receiving the multiplicand multiples represented by said representing means, means for effecting entries in said receiving accumulators, means for controlling said entry effecting means from the denominational orders of the multiplier receiving means in accordance with multiplier digit values thereon, detecting means for determining whether the values of the several multiplier digits correspond to available multiplicand multiples, or require component multiple entries, cycle control means comprising devices controlled jointly by elements of the multiplier entry means and said detecting means for determining the number of cycles required for a given multiplier entry, and control means conditioned by said cycle controller to enable one denominational order of said multiplier receiving means to control said entry effecting means to selectively control a single complete multiple entry pertaining to one order in one entry cycle of the product forming means, or to enable two denominational orders of said multiplier receiving means to control a pair of complete multiple entries pertaining to two orders in one cycle, or a single complete multiple entry pertaining to one order and a component multiple entry pertaining to another order in one cycle with the other component multiple entry in the following cycle or a pair of component multiple entries in one cycle and a pair of component multiple entries in a succeeding cycle.

27. In a multiplying machine comprising representing means from which combinable multiplicand multiple components may be derived, dual product receiving means and multiplier factor manifesting means for selecting such components, means controlled by said manifesting means for directing entry of selected components into the product receiving means and including in combination, cycle control means comprising a plurality of elements, means for selectively setting said elements according to single or double component characteristics of all the multiplier digits entered into the manifesting means, and entry control means controlled by the foregoing means and cooperating with the digital orders of the multiplier manifesting means to cause concurrent multiple entry operations in the dual product receiving means in a single entry cycle either as complete multiples or as components thereof.

JAMES W. BRYCE.
ARTHUR H. DICKINSON.